(12) United States Patent
Peric et al.

(10) Patent No.: US 7,178,553 B2
(45) Date of Patent: Feb. 20, 2007

(54) LEAK-RESISTANT SOLENOID VALVES

(75) Inventors: Yuri Peric, Oakville (CA); Mark James Britton, Dundas (CA)

(73) Assignee: Dana Canada Corporation (CA)

( * ) Notice: Subject to any disclaimer, the term of this patent is extended or adjusted under 35 U.S.C. 154(b) by 41 days.

(21) Appl. No.: 10/839,897

(22) Filed: May 6, 2004

(65) Prior Publication Data
US 2005/0189509 A1 Sep. 1, 2005

(30) Foreign Application Priority Data
Feb. 27, 2004 (CA) .................................. 2459088

(51) Int. Cl.
*F16K 11/16* (2006.01)
*F16K 31/02* (2006.01)

(52) U.S. Cl. .................... 137/630.22; 137/630.19; 251/129.19

(58) Field of Classification Search .......... 251/129.01, 251/129.02, 129.15; 137/630.19, 630.22
See application file for complete search history.

(56) References Cited

U.S. PATENT DOCUMENTS

| | | | | |
|---|---|---|---|---|
| 208,986 | A | * | 10/1878 | Patterson ................ 137/630.22 |
| 290,450 | A | | 12/1883 | Medden |
| 320,280 | A | | 6/1885 | Pearson |
| 417,136 | A | * | 12/1889 | Bell ........................ 137/505.38 |
| 424,199 | A | * | 3/1890 | Haskell ........................ 137/462 |
| 674,674 | A | | 5/1901 | Fernald |
| 809,603 | A | | 1/1906 | Barr |
| 967,820 | A | * | 8/1910 | Nchtigall ................ 137/630.19 |
| 1,457,937 | A | * | 6/1923 | Reynolds ..................... 137/495 |
| 1,648,124 | A | | 11/1927 | Hopkins |
| 1,740,420 | A | | 12/1929 | Friedman |
| 1,807,594 | A | | 6/1931 | Hopkins |
| 1,843,953 | A | * | 2/1932 | McKinney ................ 137/492.5 |
| 1,937,246 | A | | 11/1933 | Reedy |
| 1,939,128 | A | | 12/1933 | Meyer |
| 1,942,417 | A | | 1/1934 | Ferlin |
| 1,991,052 | A | | 2/1935 | Derby |
| 2,865,594 | A | * | 12/1958 | Winfree ........................ 251/75 |
| 3,034,571 | A | * | 5/1962 | Matthews .................... 110/187 |

(Continued)

OTHER PUBLICATIONS

International Search Report for PCT/CA2005/000246 Mailed May 25, 2005.

(Continued)

*Primary Examiner*—Justine R. Yu
*Assistant Examiner*—Andrew J. Rost
(74) *Attorney, Agent, or Firm*—Dykema Gossett PLLC

(57) ABSTRACT

A leak resistant solenoid valve comprises a valve body having an interior chamber, an inlet, an outlet, and at least one valve seat and valve plug located in the interior chamber. The valve plug has a sealing surface and is axially movable between open and closed positions by a solenoid which acts on the valve shaft on which the plug is carried. The valve further comprises a plug actuating mechanism for moving the plug between the open and closed positions with the solenoid energized and a biasing mechanism for biasing the plug back to the open position when the solenoid is de-energized. The plug is preferably loosely received on the shaft so as to provide self-centering. In one embodiment, the valve has a pair of valve plugs and a pair of valve seats, the seats being axially fixed to one another and the distance between the plugs being variable to provide enhanced sealing.

39 Claims, 18 Drawing Sheets

U.S. PATENT DOCUMENTS

| | | |
|---|---|---|
| 3,145,968 A | 8/1964 | Marx |
| 3,155,367 A | 11/1964 | Gifford |
| 3,282,554 A | 11/1966 | Jones |
| 3,412,756 A | 11/1968 | Shore |
| 3,414,232 A | 12/1968 | Hellman |
| 3,519,245 A | 7/1970 | Hyde |
| 3,558,098 A * | 1/1971 | Puster .......................... 251/88 |
| 3,572,631 A * | 3/1971 | Ritchart ...................... 251/210 |
| 3,926,204 A | 12/1975 | Earl |
| 4,056,119 A | 11/1977 | Allen |
| 4,089,504 A | 5/1978 | Giuliani |
| 4,550,896 A | 11/1985 | Hansen, III |
| 4,759,331 A | 7/1988 | Sausner |
| 5,108,071 A | 4/1992 | Hutchings |
| 5,217,200 A | 6/1993 | Hutchings |
| 5,303,734 A | 4/1994 | Eidsmore |
| 5,401,087 A | 3/1995 | Goossens |
| 5,425,397 A | 6/1995 | Mackal |
| 5,474,107 A | 12/1995 | Hayes |
| 5,687,756 A | 11/1997 | VanNatta |
| 5,694,975 A | 12/1997 | Eidsmore |
| 6,253,837 B1 | 7/2001 | Seller et al. |
| 6,505,812 B1 | 1/2003 | Anastas |
| 6,533,242 B2 | 3/2003 | Geib |
| 6,659,050 B1 | 12/2003 | Creech |
| 6,793,198 B2 | 9/2004 | Robison |
| 6,810,931 B2 | 11/2004 | Graffin |
| 6,886,597 B2 * | 5/2005 | Dragoni et al. ........ 137/625.33 |
| 2003/0062493 A1 | 4/2003 | Lin |
| 2003/0197142 A1 | 10/2003 | Tawns |

OTHER PUBLICATIONS

Crane Catalogue, Section 2, Bronze Valves, pp. 2-27 and 2-29, May 1961.

ISA Handbook of Control Valves, 2nd Edition, pp. 14-15, Jun. 1, 1976.

Parker Fluid Connectors, Rising Stem Plug Valve, p. 13, Jul. 1994.

* cited by examiner

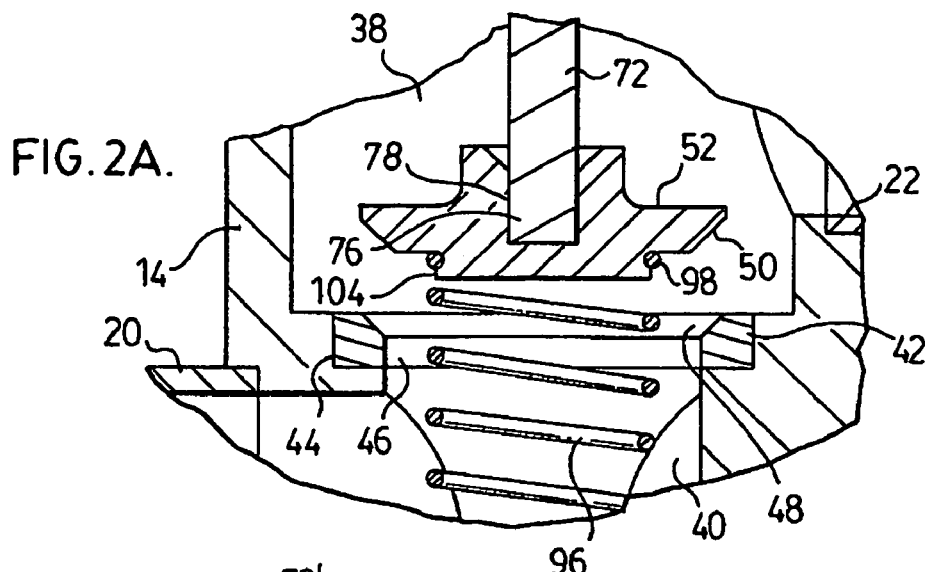
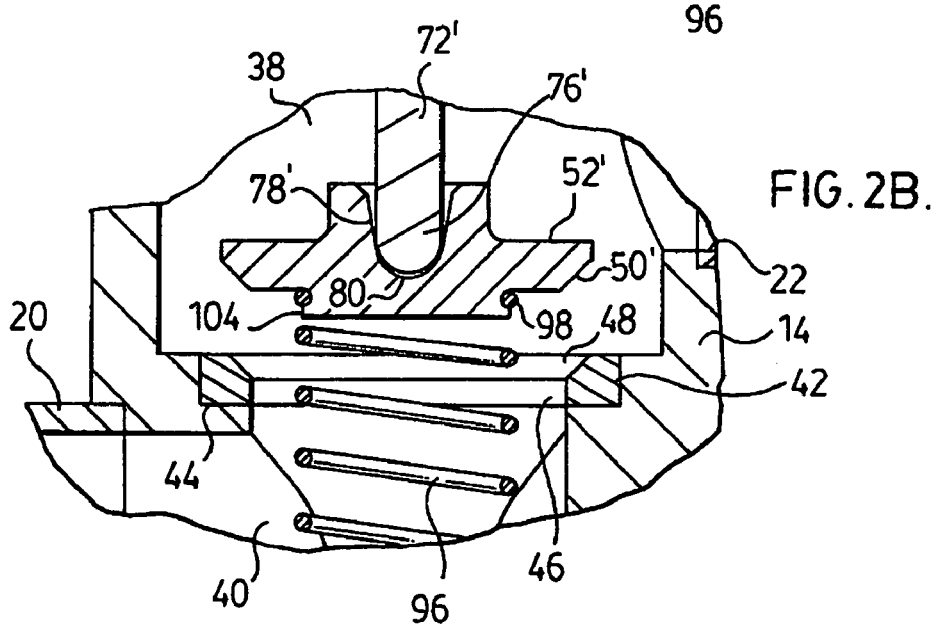
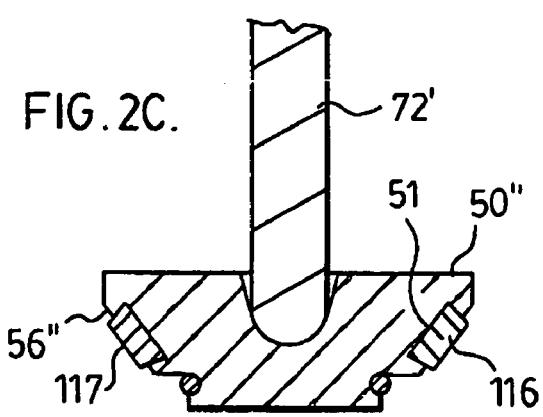

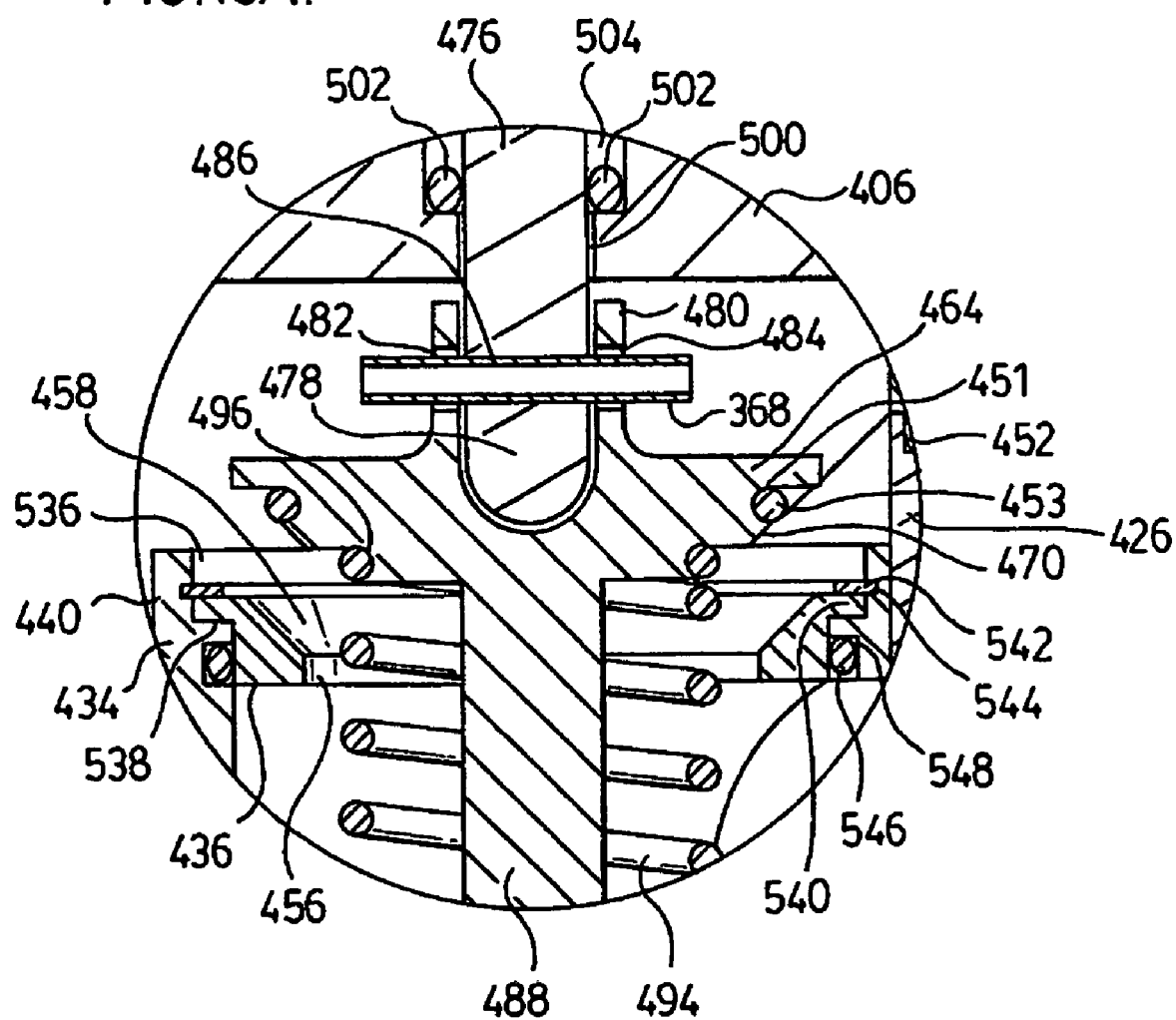

LEAK-RESISTANT SOLENOID VALVES

This application claims priority to Canadian Patent Application No. 2,459,088 filed Feb. 27, 2004.

FIELD OF THE INVENTION

The present invention relates to valves, and more particularly to leak-resistant solenoid valves suitable for controlling fluid flow in automotive and other applications.

BACKGROUND OF THE INVENTION

Fluid flow control valves are used extensively in automotive and other applications, for example to control flow of coolant or other fluids under varying operating conditions. In order to satisfy customer demands, such valves must be robust, reliable and inexpensive. There is a continued need for improved valve designs which attain these objectives.

SUMMARY OF THE INVENTION

In one aspect, the present invention provides a valve comprising (a) a valve body having an interior chamber, an inlet and an outlet; (b) a valve seat provided in the interior chamber of the valve body, the valve seat having a sealing surface; (c) a valve plug provided in the interior chamber of the valve body, the valve plug having a sealing surface and being movable along an axis between an open position and a closed position, wherein the respective sealing surfaces of the plug and the seat are spaced from one another in the open position and are sealingly engaged with one another in the closed position, and wherein the inlet and the outlet are in flow communication with one another through the interior chamber with the plug in the open position; (d) a plug actuating mechanism for moving the valve plug along the axis from the open position to the closed position; and (e) a biasing mechanism for biasing the plug axially toward the open position.

In another aspect, the present invention provides a valve comprising (a) a valve body having an interior chamber, an inlet and an outlet; (b) a pair of valve seats provided in the interior chamber of the valve body, the valve seats being spaced from one another along an axis, each of the valve seats having a sealing surface; (c) a pair of valve plugs provided in the interior chamber of the valve body, the valve plugs being spaced from one another along the axis, each of the valve plugs having a sealing surface and being movable along the axis between an open position and a closed position, wherein the sealing surfaces of the plugs and the seats are spaced from one another in the open position and wherein each of the plugs sealingly engages one of the seats along their respective sealing surfaces in the closed position, and wherein the inlet and the outlet are spaced from one another in a direction normal to the axis and are in flow communication with one another through the interior chamber with the plug in the open position; (d) a plug actuating mechanism for moving the valve plugs along the axis from the open position to the closed position; and (e) a first biasing mechanism for biasing the plugs axially toward the open position.

BRIEF DESCRIPTION OF THE DRAWINGS

The invention will now be described, by way of example only, with reference to the accompanying drawings in which:

FIG. 2A is a close-up of area A shown in FIG. 1;

FIG. 2B is a close-up of area A showing an alternate configuration of valve shaft and valve plug;

FIG. 2C is a close-up of a plug having a resilient sealing member;

FIG. 15A is a close-up of area F of FIG. 15;

DETAILED DESCRIPTION OF PREFERRED EMBODIMENTS

Figure 1:
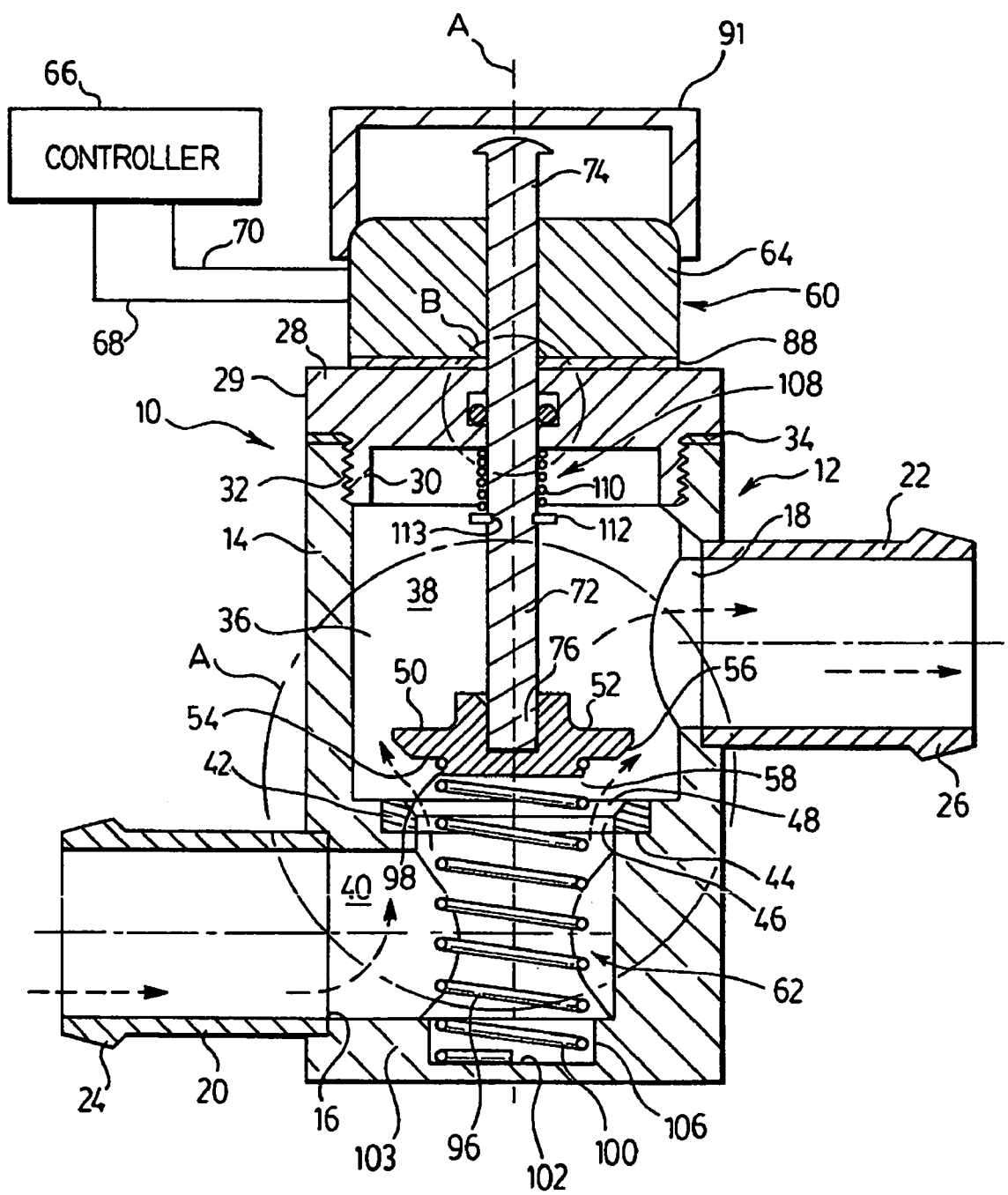
FIG. 1 is a cross-sectional side view (along line B—B of FIG. 5) showing a leak-resistant solenoid valve according to a preferred embodiment of the invention, with the valve being shown in its open configuration.

A preferred single seat valve 10 according to the invention is now described with reference to FIGS. 1 to 6. Valve 10 comprises a valve body 12 comprising a housing 14 which, as shown in the plan view of FIG. 5, may preferably have a square or rectangular shape. The housing 14 is provided with a pair of openings 16, 18 which are offset relative to one another along an axis A.

The valve body 12 further comprises inlet and outlet fittings 20, 22 which are secured to the valve body 12 at openings 16, 18. The inlet and outlet fittings 20, 22 are preferably cylindrical in shape, with ribs 24, 26 being provided at their ends for connection to a fluid carrying conduit (not shown) such as a hose. Although fittings 20, 22 are provided with ribs 24, 26, it will be appreciated that the fittings 20, 22 may instead be provided with any one of a number of known means for connecting to a fluid carrying conduit. In a particularly preferred embodiment of the invention, the housing 14 and fittings 20, 22 are made of aluminum or alloys thereof and are attached together by brazing.

The upper end of valve body 12 is closed by a top wall 28 which, as shown in the drawings, may preferably be in the form of a union fitting 29 having a lower externally threaded portion 30 which is received in an internally threaded cylindrical bore 32 of the housing 14. A seal between the union fitting 28 and the housing 14 is provided by gasket 34.

The valve body 12 has an interior chamber 36 which is generally cylindrical and extends along axis A. The interior chamber 36 has an upper portion 38 of relatively greater diameter and a lower portion 40 which is of relatively smaller diameter. The upper portion 38 of interior chamber 36 is in direct communication with the valve outlet 22 and the lower portion 40 of the interior chamber 36 is in direct communication with the valve inlet 20.

Separating the upper and lower portions 38, 40 of interior chamber 36 is an annular valve seat 42 which is received in a notched, annular seating surface 44 provided in the housing 14. If desired, the valve seat 42 may be retained in surface 44 by a friction fit, by threads or by some type of mechanical fastener such as pins or screws. The inner periphery of valve seat 42 is provided with an axial face 46 and a sealing surface 48 which is preferably chamfered, i.e. tapers outwardly from the axial face 46 at an angle to the axis A. Preferably, the angle is about 45°. The valve seat 42 may preferably be formed from bronze, stainless steel, brass or other suitable material.

Figure 3:
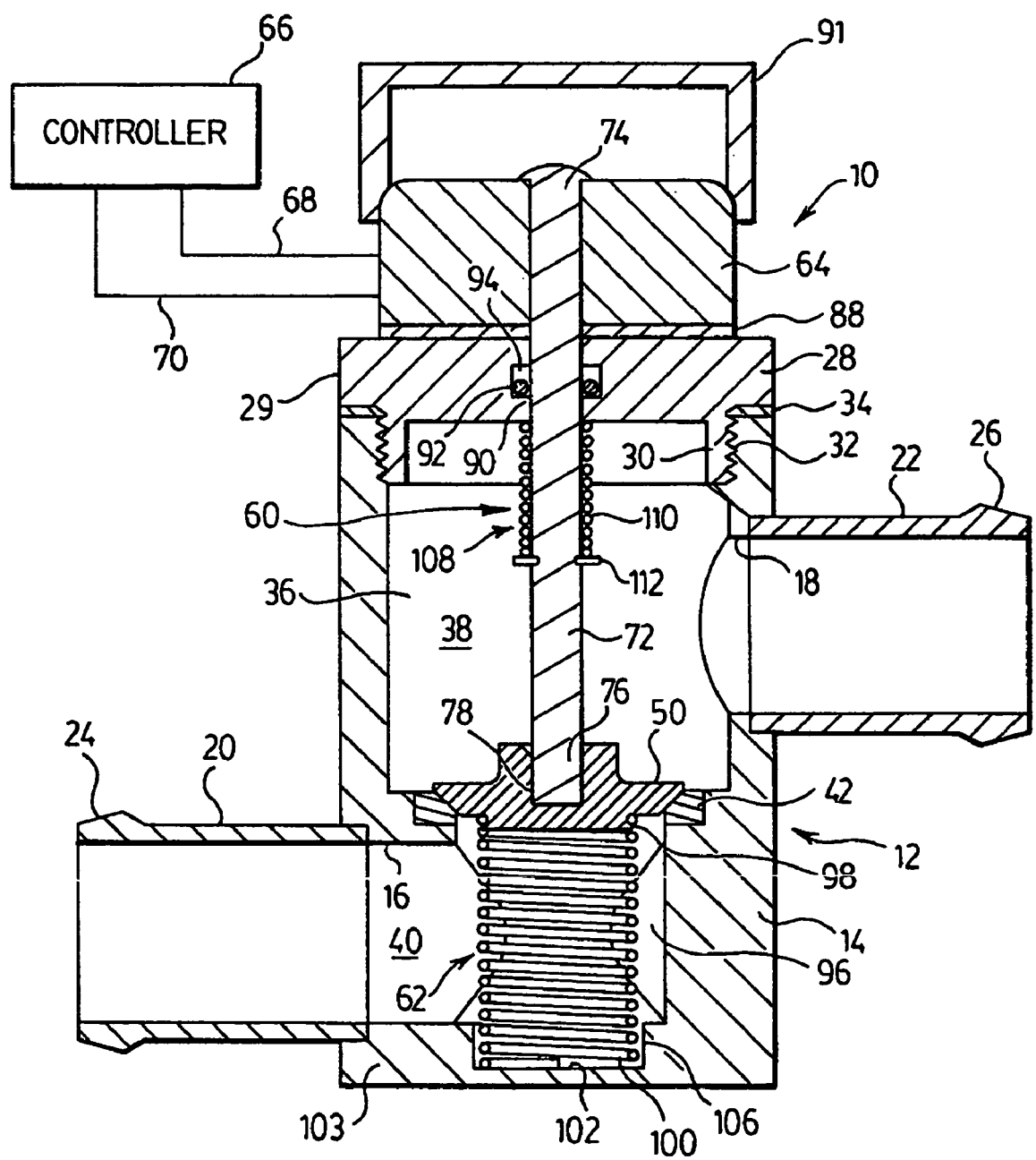
FIG. 3 is a cross-sectional side view (along line B—B of FIG. 5) showing the valve of FIG. 1 shown in its closed configuration.
Figure 4:
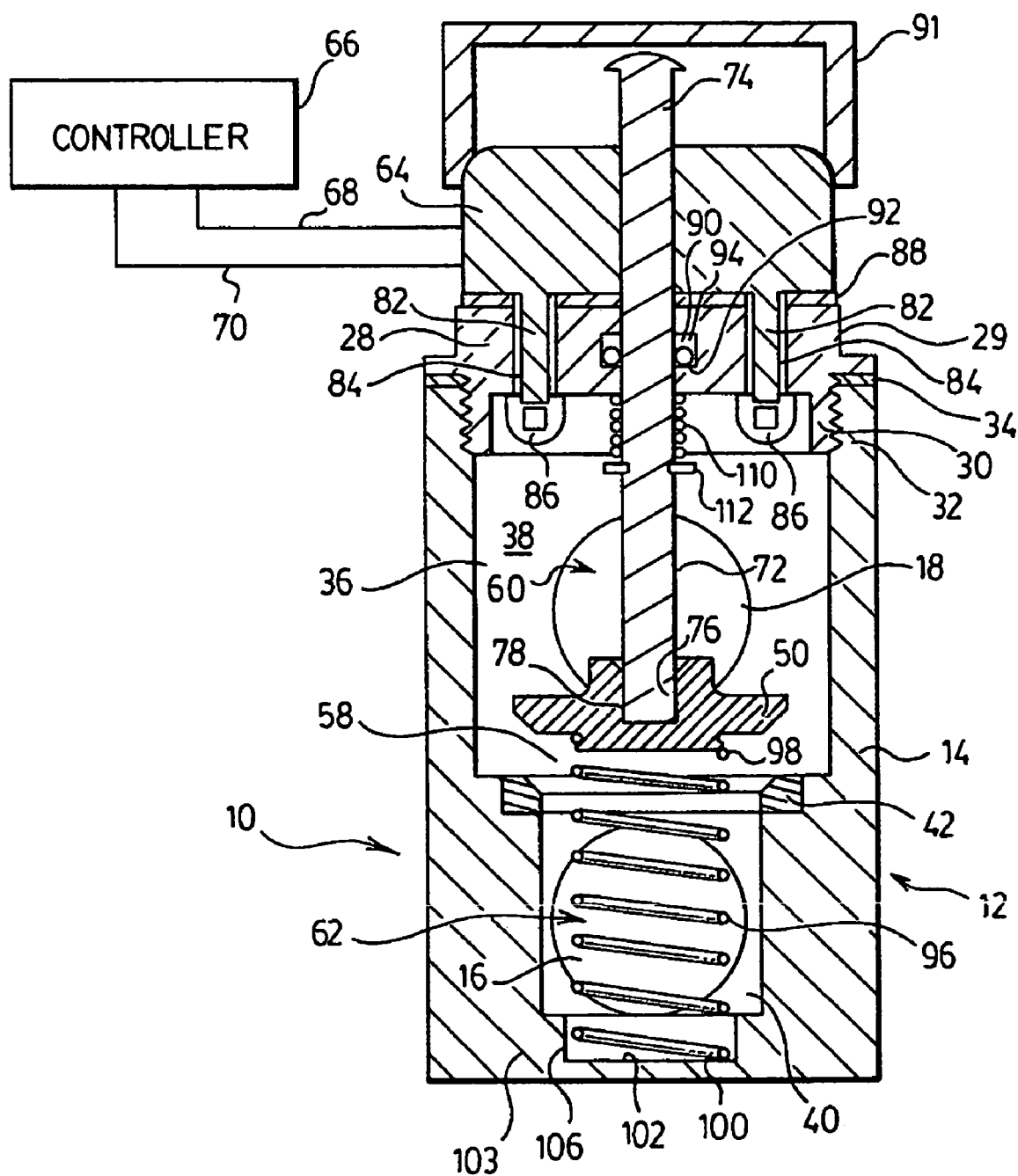
FIG. 4 is a cross-sectional front view (along line A—A of FIG. 5) showing the valve of FIG. 1.
Figure 5:
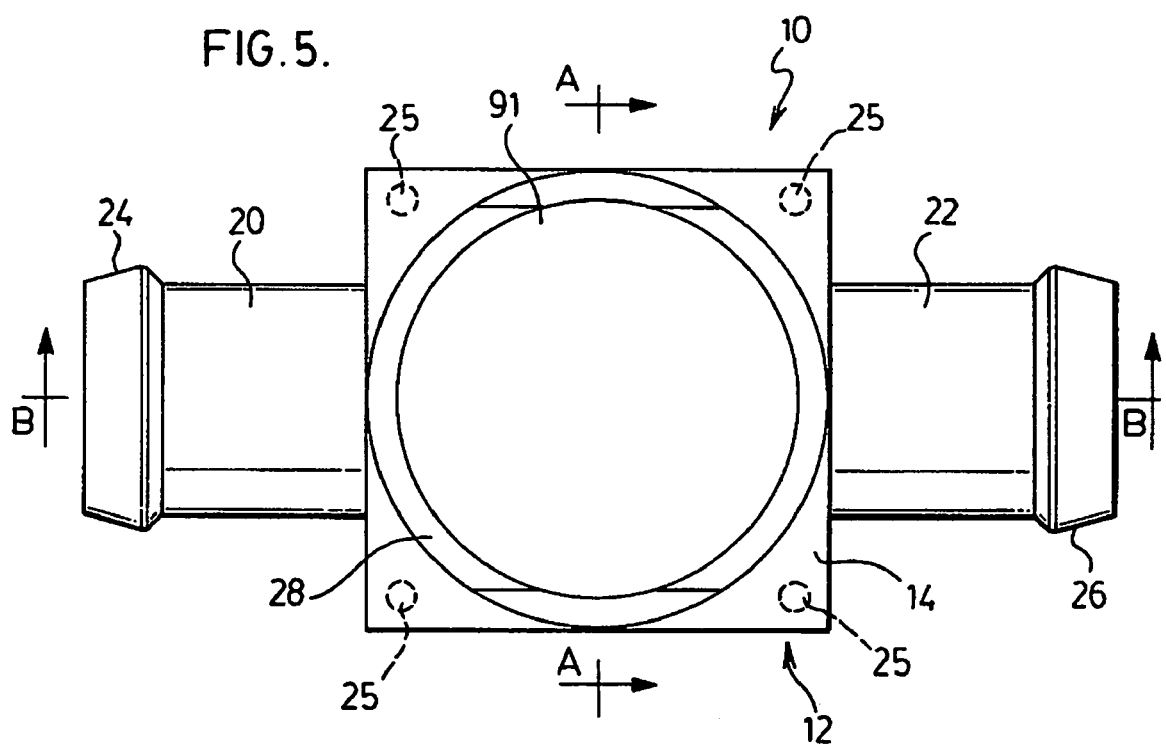
FIG. 5 is a top plan view of the valve of FIG. 1.

The valve 10 is closed and opened by a valve plug 50 which is provided in the interior chamber 36 of the valve body 12 and which is movable along axis A between an open position shown in FIG. 1 and a closed position shown in FIG. 3. The valve plug 50 has an upper side 52 and an opposed lower side 54, the lower side 54 being provided with an annular sealing surface 56. As shown in the drawings, the sealing surface 56 of plug 50 is angled relative to axis A so as to sealingly engage the sealing surface 48 of valve seat 42 when the valve 10 is closed as in FIG. 3. Preferably, sealing surface 56 is angled by about 45° relative to axis A. The plug 50 may preferably be formed from bronze, stainless steel, brass or other suitable material.

In order to provide enhanced sealing, the sealing surface 56 of the plug 50 or the sealing surface 48 of valve seat 42 may preferably be provided with an annular groove within which is received a resilient sealing element which may be formed from a polymeric material such as rubber, Teflon or other suitable material. FIG. 2C illustrates an example of a valve plug 50" having a wedge-shaped annular groove 51 in which is received a wedge-shaped annular sealing element 116 which is preferably made of a resilient material. Preferably, the outer surface 117 of the sealing element 116 stands proud of the sealing surface 56" of plug 50" so as to sealingly engage the sealing surface 48 of the valve seat 42 when the valve is closed.

As shown in FIG. 1, the respective sealing surfaces 56 and 48 of the plug 50 and valve seat 42 are spaced from one another when the plug 50 is in the open position. This permits flow communication between the inlet 20 and outlet 22 through the interior chamber 36, with the fluid flowing through an annular gap 58 between the plug 50 and valve seat 42. The flow path through the valve is illustrated by dashed arrows in FIG. 1.

Valve 10 further comprises a plug actuating mechanism, generally identified by reference numeral 60, for moving the valve plug 50 along axis A from the open position of FIG. 1 to the closed position of FIG. 3. The valve 10 further comprises a biasing mechanism generally identified by reference numeral 62 for biasing the plug 50 toward the open position of FIG. 1, for reasons discussed more fully below.

As shown in the drawings, the plug actuating mechanism 60 of valve 10 comprises a solenoid 64 which may, for example, be an on-off solenoid or a proportionately controlled solenoid. In preferred valve 10, solenoid 64 is an on-off solenoid. An external controller 66 is provided for intermittently energizing the solenoid 64 with an electric current which flows between controller 66 and solenoid 64 through electrical conductors 68, 70.

The plug actuating mechanism 60 further comprises a valve shaft 72 through which the solenoid 64 acts on the valve plug 50, the valve shaft 72 having an upper end 74 and a lower end 76 axially spaced from one another, the shaft 72 being reciprocally movable along axis A. As schematically shown in FIG. 1, the upper end 74 of valve shaft 72 is engaged by the solenoid 64, such that when the solenoid 64 is energized by an electric current, the valve shaft 72 moves downwardly toward the valve seat 42. As can be seen from the enlarged views of FIGS. 2A and 2B, the valve plug 50 is carried by the lower end 76 of the shaft 72. Therefore, energizing solenoid 64 causes the valve plug 50 to move toward the closed position.

The lower end 76 of valve shaft 72 is received in a cylindrical depression 78 formed in the upper side 52 of plug 50. Two different preferred arrangements are shown in the drawings. In the arrangement shown in FIG. 2A, the diameter of the depression 78 is sized to closely receive the lower end 76 of the shaft 72. In an alternate embodiment illustrated in FIG. 2B, the cylindrical depression 78' of the plug 50' is slightly greater than the diameter of valve shaft 72' such that the valve plug 50' is displaceable by a small amount normal to the axis A. Preferably, the difference in the diameters of the valve shaft 72' and the cylindrical depression 78' is no more than 10 percent of the diameter of the shaft 72', with the difference in diameter typically not exceeding about 0.5 mm. This permits small lateral adjustments of the valve plug 50' relative to valve seat 42, thereby providing enhanced sealing. In the variation illustrated in FIG. 2B, the lower end 76' of valve shaft 72' is preferably smoothly rounded and the depression 78' in the valve 50' preferably has a rounded bottom wall 80 against which the lower end 76' of the valve shaft 72' is received. This enhances the "self-centering" operation of the plug 50'.

Figure 6:
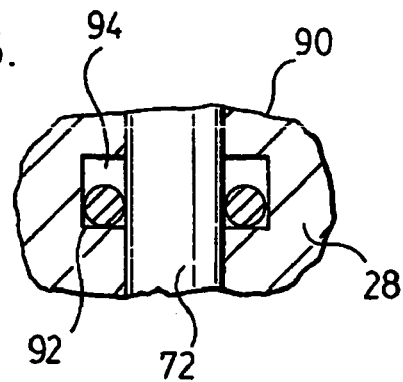
FIG. 6 is a close-up of area B shown in FIG. 1.

As best seen in the close-up of FIG. 6, the valve shaft 72 extends through a central aperture 90 in top wall 28 and a sliding seal between shaft 72 and aperture 90 is provided by a resilient O-ring 92 seated in a groove 94 formed in the axially extending wall of aperture 90. As shown in the drawings, the solenoid 64 is preferably mounted on the top wall 28 of the valve body 12 and is located outside the interior chamber 36. The top of solenoid 64 and the upper end 74 of valve shaft 72 may preferably be enclosed by a top cap 91. The solenoid 64 may preferably be provided with studs 82 (FIG. 4) which extend through apertures 84 in top wall 28 and which engage threaded dome nuts 86 in the interior chamber 36. A gasket 88 is preferably received between solenoid 64 and top wall 28 to provide a fluid-tight seal. Although a specific means for attaching the solenoid to the top wall is illustrated in the drawings, it will be appreciated that the solenoid may be integrally formed with the top wall of the valve body.

The biasing mechanism 62 preferably comprises a coil spring 96 having an upper end 98 and a lower end 100. The upper end 98 of spring 96 engages the valve plug 50 and the lower end engages a seating surface 102 in a bottom wall 103 of the valve body 12. The coil spring 96 preferably extends axially through the lower portion 40 of interior chamber 36 and, in the open position of FIG. 1, the upper end 98 of spring 96 extends past valve seat 42 into the upper portion 38 of interior chamber 36.

As shown in FIG. 1, the upper end 98 of spring 96 engages the lower side 54 of plug 50, which may preferably be provided with a groove 104 (FIG. 2A) in which the upper end 98 of spring 96 is received. The seating surface 102 for the lower end 100 of spring 96 is preferably provided in a cylindrical depression 106 formed in the bottom wall 103 of valve body 12. As will be apparent from the drawings, the spring 96 biases the valve plug 50 upwardly toward the open position shown in FIG. 1.

As shown in FIGS. 1 to 4, the valve 10 may also be provided with a second biasing mechanism generally identified by reference numeral 108. The second biasing mechanism 108 preferably comprises a coil spring 110 surrounding the valve shaft 72 proximate its upper end 74. The coil spring 110 is located within the interior chamber 36 between the top wall 28 of the valve body 12 and a radially-extending retaining element 112 provided on the valve shaft 72 intermediate its ends 74, 76. Preferably, the retaining element 112 comprises an "E-clip" which is received in a groove 113 on shaft 72. The second biasing mechanism 108 is optional and provides damping of the upward movement of the valve shaft 72 and plug 50 during opening of the valve 10.

Operation of valve 10 will now be briefly described with reference to the drawings.

In the open configuration shown in FIG. 1, a fluid such as engine coolant enters inlet 20 in a direction which is substantially normal to axis A, flows upwardly along axis A through the lower portion 40 of interior chamber 36, through gap 58 into the upper portion 38 of interior chamber 36, and finally exits the valve 10 through outlet 22 in a direction substantially normal to the axis A. With valve 10 in the open position shown in FIG. 1, the solenoid 64 is preferably in a non-energized state so that coil spring 96 is able to hold the plug 50 away from valve seat 42. Having the valve 10 open in the non-energized state of solenoid 64 is preferred so that a malfunction in the controller 66 or solenoid 64 will not cut off the flow of fluid, thereby avoiding damage to the engine and other components.

Once the solenoid 64 is energized, the valve shaft 72 and the associated plug 50 are caused to move downwardly against the force of spring 96 until the sealing surface 56 of valve plug 50 engages the sealing surface 48 of valve seat 42. In the embodiment of FIG. 2B, the plug 50' may be displaced laterally by a small amount in order to accomplish effective sealing. Once the valve seat 42 and the valve plug 50 are in complete engagement, flow of fluid through the interior chamber 36 from inlet 20 to outlet 22 is substantially prevented. Discontinuing the flow of electric current to solenoid 64 will then permit the spring 96 to move the plug 50 upwardly out of engagement with the valve seat 42, thereby restoring fluid flow through gap 58.

Figure 7:
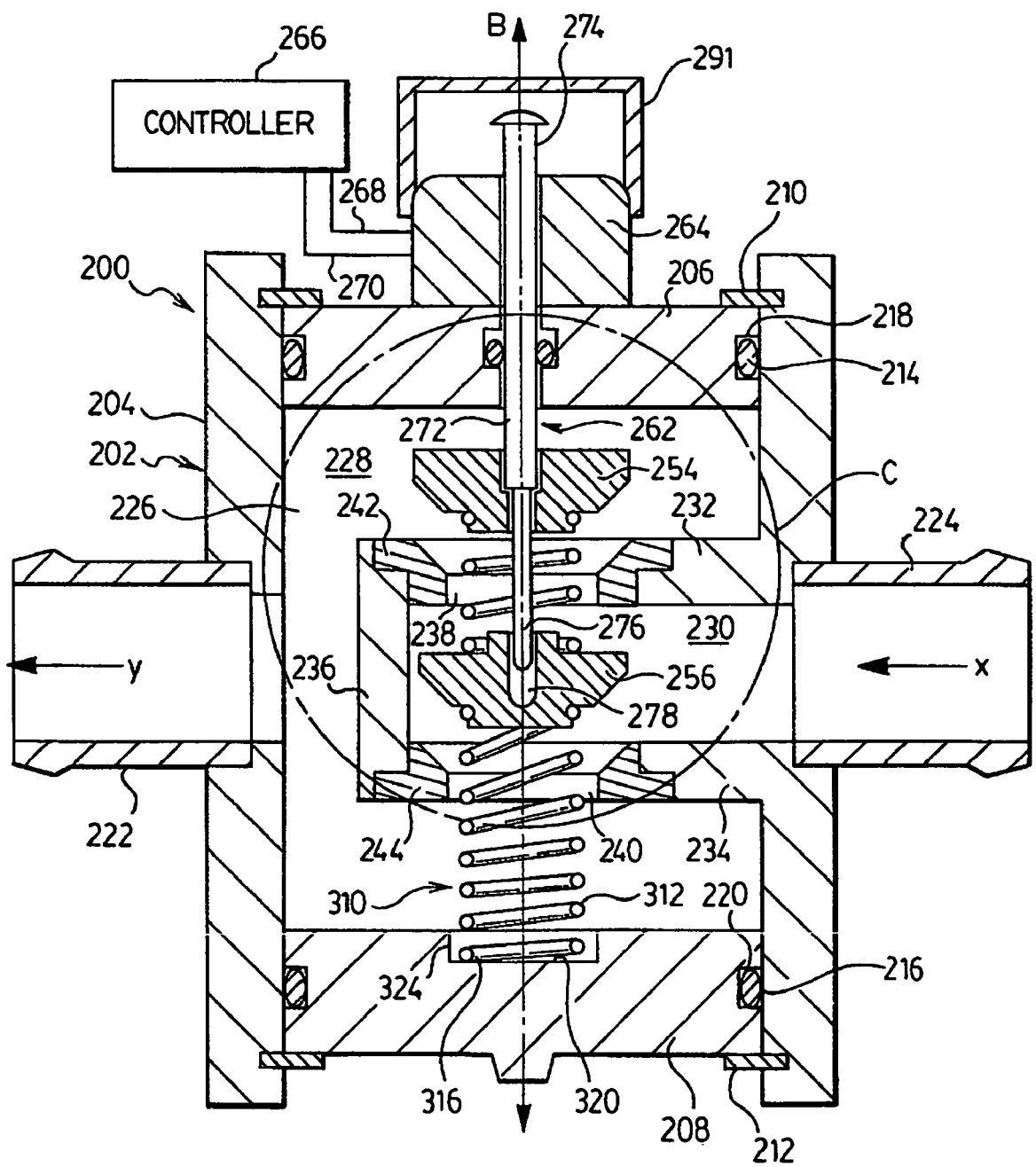
FIG. 7 is a cross-sectional side view of a leak-resistant solenoid valve according to another preferred embodiment of the invention in the open configuration.

A second preferred valve 200, is now described with reference to FIGS. 7 to 9. Valve 200 comprises a valve body 202 having a housing 204 enclosed by a top wall 206 and a bottom wall 208. As shown in FIG. 7, the top and bottom walls 206, 208 are retained by C-clips 210, 212 and are sealed to the housing 204 by resilient O-rings 214, 216 received in annular grooves 218, 220 of the top wall 206 and bottom wall 208, respectively. It will be appreciated that the top and bottom walls 206, 208 are not necessarily attached to housing 204 by the specific means shown in the drawings. For example, the top and bottom walls may preferably comprise threaded fittings, similar to union fitting 29 described above, which are received in threaded opening in the housing. Alternatively, the grooves in which O-rings 214 and 216 are received may be formed in the housing 204 rather than top and bottom walls 206, 208.

Attached to the housing 204 are outlet and inlet fittings 222, 224 which may preferably be similar in configuration to the fittings 22, 20 described above. Preferably, the inlet and outlet 224, 222 of valve 200 are in alignment with one another along an axis B, such that fluid flows generally normal to the axis B from inlet 224 to outlet 222 through the interior chamber 226 of valve body 202 as shown by arrows X and Y in FIG. 7.

The interior chamber 226 is preferably divided into two portions, an outlet portion 228 which is in direct communication with outlet 222 and an inlet portion 230 which is in direct communication with the inlet 224.

The inlet and outlet portions 230, 228 are separated from one another by an upper wall 232, an opposed lower wall 234 and a side wall 236 between the upper and lower walls 232, 234. The upper and lower walls 232, 234 are provided with aligned openings 238, 240 respectively, through which fluid flows between the inlet portion 230 and outlet portion 228 of the interior chamber 226. Each of these openings 238, 240 is provided with an annular valve seat 242, 244 similar to valve seat 42 described above. Upper valve seat 242 has an inner axial wall 247 and an angled sealing surface 248. The lower valve seat 244 similarly has an axial inner wall 250 and an angled sealing surface 252. As will be appreciated from the drawings, the valve seats 242, 244 are separated by a fixed axial spacing.

The valve 200 further comprises a pair of valve plugs 254, 256 provided with annular sealing surfaces 258, 260, respectively for sealing with the upper and lower valve seats 242, 244. The valve plugs 254, 256 may preferably be the same as plugs 50, 50' or 50" described above, and may preferably be provided with a resilient sealing element as described above. Alternatively, the valve seats 242, 244 may be provided with resilient sealing elements as described above with reference to valve seat 42.

Figure 9:
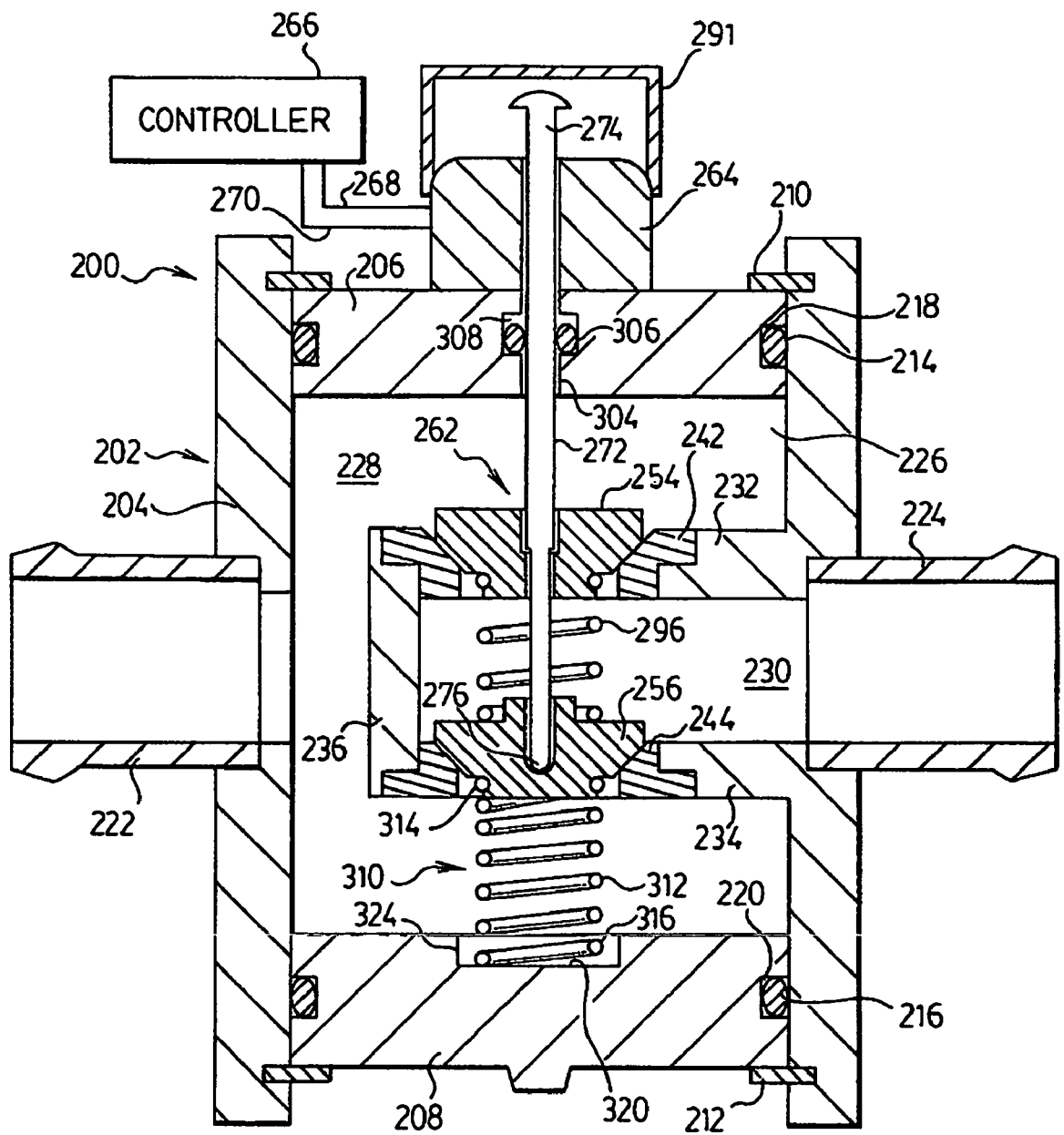
FIG. 9 shows the valve of FIG. 7 in the closed configuration.

The valve plugs 254, 256 are spaced from one another along axis B and each are movable along the axis between an open position shown in FIG. 7 and a closed position shown in FIG. 9. As shown in FIG. 7, the sealing surfaces 258, 260 of plugs 254, 256 are spaced from the sealing surfaces of valve seats 242, 244 in the open position. With the valve 200 in the fully closed position, each of the plugs 254, 256 sealingly engages one of the valve seats 242, 244 along their respective sealing surfaces.

As in the valve 10 described above, the valve 200 is provided with a plug actuating mechanism for moving the valve plugs 254, 256 along the axis B from the open position to the closed position, and a biasing mechanism for biasing the plugs 254, 256 toward the open position.

The plug actuating mechanism is generally identified by reference numeral 262, and comprises a solenoid 264, the top of which may preferably be covered by top cap 291. The solenoid 264 may, for example, comprise an on-off solenoid or a proportionately controlled solenoid. In preferred valve 200, solenoid 264 is an on-off solenoid. An external controller 266 is provided for intermittently energizing the solenoid 264 with an electric current, and electrical conductors 268, 270 are provided through which the current flows between controller 266 and solenoid 264.

The plug actuating mechanism further comprises a valve shaft 272 through which the solenoid 264 acts on the valve plugs 254, 256, the valve shaft 272 having an upper end 274 and a lower end 276 axially spaced from one another, the shaft 272 being reciprocally movable along axis B. As schematically shown in FIG. 7, the upper end 274 of valve shaft 272 is engaged by the solenoid 264, such that when the solenoid 264 is energized by an electric current, the valve shaft 272 moves downwardly along axis B. As described below in more detail, the valve plugs 254, 256 are carried by the valve shaft 272. Therefore, energizing solenoid 264 causes the valve plugs 254, 256 to move toward the respective valve seats 242, 244.

As in valve 10, the lower plug 256 of valve 200 is provided with a cylindrical depression 278 in which the lower end 276 of valve shaft 272 is received. In the embodiment shown in FIG. 7, the lower end 276 of valve shaft 272 and the cylindrical depression 278 are similar in form to those shown in FIG. 2B, so as to permit limited lateral movement of the lower plug 256. This provides "self-centering" as in the embodiment discussed above in connection with FIG. 2B. It is to be appreciated that the difference in diameter between the lower end 276 of shaft 272 and the cylindrical depression 278 is somewhat exaggerated in FIG. 7 so as to more clearly illustrate the "self-centering" feature.

It can be seen from FIG. 7 that the lower end 276 of shaft 272 is not fully seated in cylindrical depression 278 when the valve 200 is open. That is, there is a gap between the lower end 276 of shaft 272 and the bottom wall 280 of the depression 278. As will be seen in the drawings, this permits the distance between the upper and lower plugs 254, 256 to be varied by a limited amount during opening and closing of valve 200. Permitting plugs 254, 256 to move axially relative to one another by a limited amount assists in providing effective seals with the two valve seats 242, 244.

Figure 8:
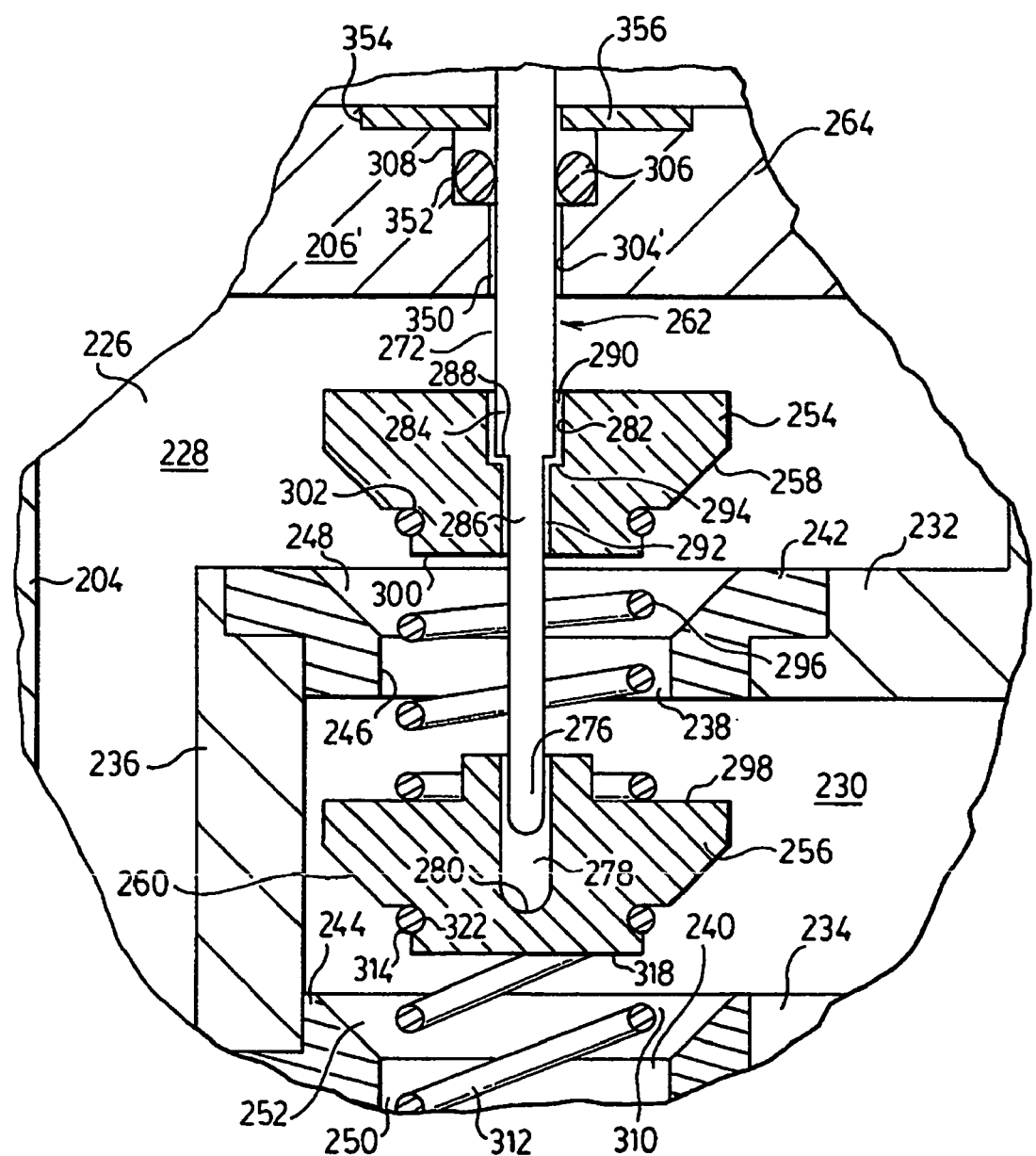
FIG. 8 is a close-up of area C of FIG. 7.

As shown in FIG. 8, the upper valve plug 254 is mounted on shaft 272 intermediate its upper and lower ends 274, 276, with the shaft 272 extending through a central aperture 282 of the upper plug 254. The shaft 272 is preferably loosely received inside aperture 282 so as to provide the upper plug 254 with "self-centering" capability as described above for valve plugs 50' and 256. In order to limit upward movement of the upper valve plug 254, the valve shaft is preferably formed with an upper large diameter portion 284 and a lower small diameter portion 286 separated by a radially extending shoulder 288. The central aperture 282 of plug 254 is similarly formed with an upper large diameter portion 290 and a lower small diameter portion 292 separated by a radially extending shoulder 294. The shoulders 288 and 294 engage one another to act as stops which prevent upward movement of plug 254 along shaft 272.

The upper and lower plugs 254, 256 are preferably biased away from one another by a coil spring 296 which extends axially between the upper surface 298 of the lower valve plug 256 and the lower surface 300 of the upper valve plug 254. As with plug 50 described above, the lower surface 300 of upper valve plug 254 may preferably be provided with an annular groove 302 to retain the upper end of spring 296.

The valve shaft 272 extends through a central aperture 304 in the top wall 206 and a sliding seal between shaft 272 and aperture 304 is provided by a resilient O-ring 306 seated in an annular groove 308 formed in the axially extending wall of aperture 304.

The biasing mechanism of valve 200 is generally identified by reference numeral 310 and preferably comprises a coil spring 312 having an upper end 314 and a lower end 316. The upper end 314 of spring 312 engages the lower surface 318 of lower valve plug 256 and the lower end 316 of spring 312 engages a seating surface 320 in the bottom wall 208 of the valve body 204. The coil spring 312 preferably extends axially through the outlet portion 228 of interior chamber 226 and, in the open position of FIG. 7, the upper end 314 of spring 312 extends past the lower valve seat 242 into the inlet portion 230 of interior chamber 226.

As shown in FIG. 7, the lower surface 318 of lower valve plug 256 may preferably be provided with an annular groove 322 in which the upper end 314 of spring 312 is received. The seating surface 320 for the lower end 316 of spring 312 is preferably provided in a cylindrical depression 324 formed in the bottom wall 208 of the valve body 204. As will be apparent from the drawings, the spring 312 biases the valve plug 256 upwardly toward the open position shown in FIG. 7.

Operation of valve 200 will now be briefly described with reference to the drawings.

In the open configuration shown in FIG. 7, a fluid such as engine coolant enters inlet 224 in a direction which is substantially normal to axis B, flows through the inlet portion 230 of interior chamber 226, through the gaps between the plugs 254, 256 and valve seats 242, 244 into the outlet portion 228 of interior chamber 226, and finally exits the valve 200 through outlet 222 in a direction substantially normal to the axis B. With valve 200 in the open position shown in FIG. 7, the solenoid 264 is preferably in a non-energized state so that coil spring 312 of biasing mechanism 310 is able to hold the plugs 254, 256 away from valve seats 242, 244. When open, the spacing between the plugs 254, 256 and seats 242, 244 is preferably about 5 to 6 mm.

Once the solenoid 264 is energized, the valve shaft 272 and the associated plugs 254, 256 are caused to move downwardly against the force of relatively weaker spring 312 until the sealing surface 260 of lower valve plug 256 engages the sealing surface 250 of lower valve seat 244. In order to ensure that the lower valve plug 256 is seated first, the axial distance between the upper valve plug 254 and the upper valve seat 242 is from about 0.5 to about 1 mm greater than the axial distance between the lower valve plug 256 and the lower valve seat 244. In this intermediate position, the lower valve plug 256 is sealed against the lower valve seat 244, the upper valve plug 254 is spaced from the upper valve seat 242 by about 0.5 to 1 mm, and the lower end 276 of valve shaft 272 remains spaced from the bottom wall 280 of the cylindrical depression 278 of the lower valve plug 256 by an amount greater than the axial spacing between the upper plug 254 and the upper valve seat 242. Thus, fluid continues to flow between the upper valve plug 254 and upper valve seat 242 in this intermediate configuration.

Downward movement of the valve shaft 272 continues with the lower end 276 of valve shaft 272 approaching the bottom wall 280 of the cylindrical depression 278. This causes compression of relatively stronger spring 296, causing the distance between the valve plugs 254, 256 to be reduced, and also causing the sealing surface 258 of the upper valve plug 254 to be brought into sealing engagement with the sealing surface 248 of the upper valve seat, thereby completely closing the valve 200 as shown in FIG. 9. It is preferred that the depth of depression 278 is sufficient that a small clearance exists between the bottom wall 280 of depression 278 and the lower end 276 of valve shaft 272, even when the valve is completely closed. This helps to ensure that both plugs 254, 256 are effectively seated.

Discontinuing the flow of electric current to solenoid 264 will then permit expansion of springs 296 and 312, thereby moving the plugs 254, 256 upwardly out of engagement with the valve seats 242, 244 and restoring fluid flow through valve 200.

Although not shown in FIG. 7, it will be appreciated that valve 200 may preferably be provided with a second biasing mechanism, similar to mechanism 108 described above, for damping upward movement of the valve shaft 272 and plugs 254, 256 during opening of valve 200.

It will also be appreciated that formation of annular groove 308 in the central aperture 304 of top wall 206 may be difficult. FIG. 8 illustrates an alternate arrangement which avoids formation of such a groove. As shown in FIG. 8, the aperture 304' in top wall 206' has a stepped arrangement, having a lower portion 350 of small diameter, an intermediate portion 352 of intermediate diameter and an upper portion 354 of relatively large diameter. The O-ring is received inside the intermediate portion 352 of aperture 304' and is retained by an annular washer 356 or the like which is received in the relatively shallow upper portion 354.

Figure 10:
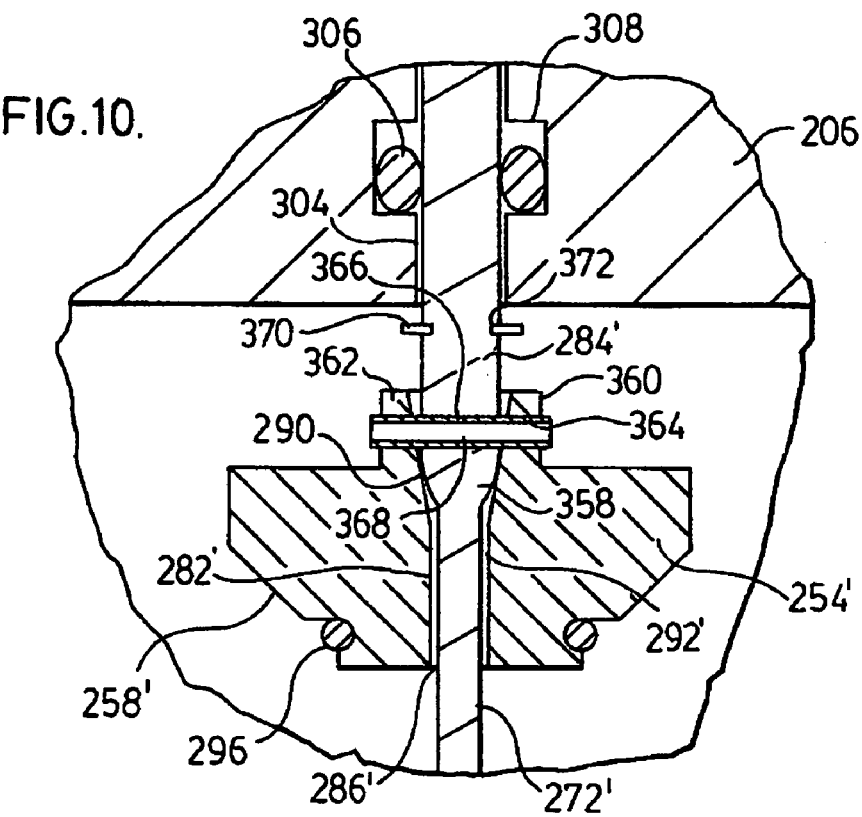
FIG. 10 is a close-up of an upper plug having alternate means of attachment to the valve shaft.
Figure 11:
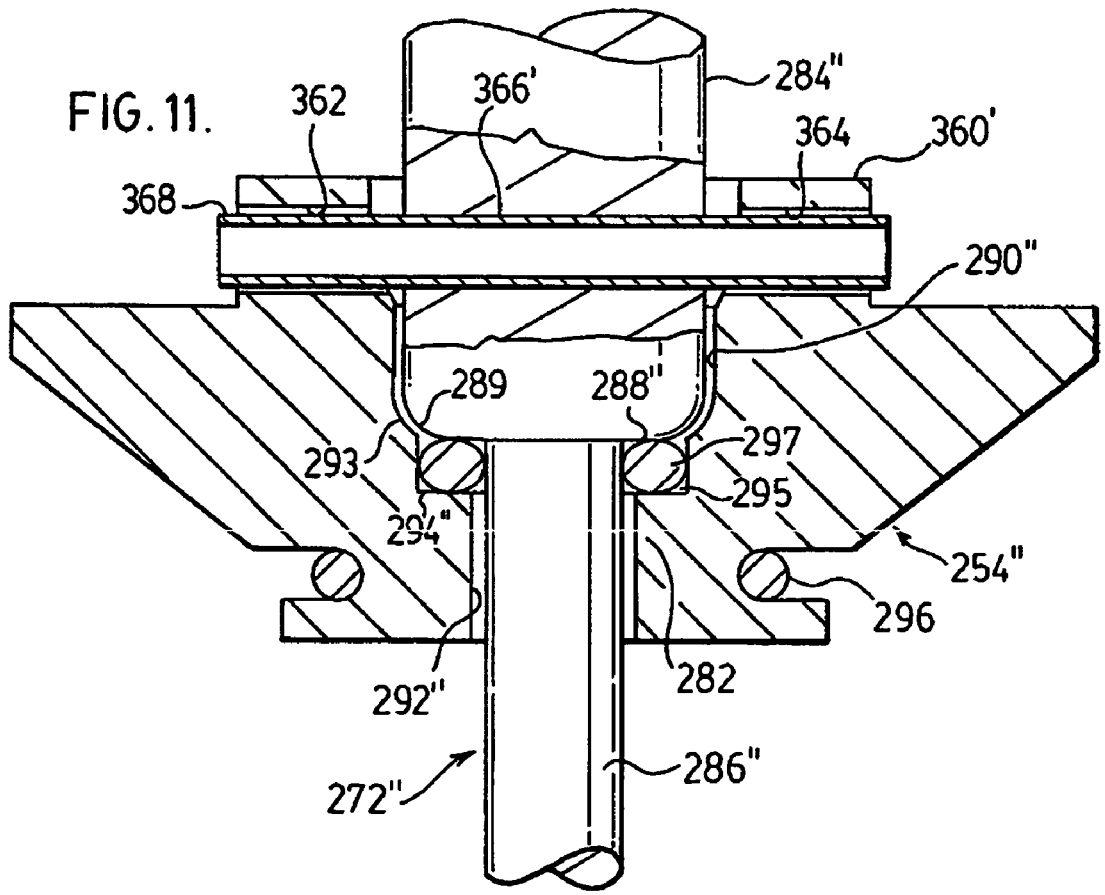
FIG. 11 is a close-up of an upper plug also having means for providing a seal between the shaft and the plug.
Figure 12:
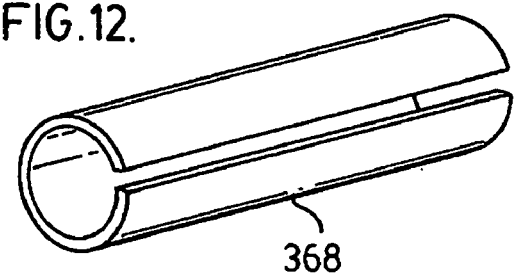
FIG. 12 is a perspective view of a pin for attaching the plug to the shaft as in FIGS. 10 and 11.

FIGS. 10 to 12 illustrate alternate manners in which upper plug 254 may be retained on valve shaft 272 in a valve 200. In FIG. 10, the valve shaft 272' has an upper large diameter portion 284' and a lower small diameter portion 286' separated by a rounded shoulder 358. Similarly, the central aperture 282' of the upper plug 254' has an upper portion 290' of large diameter and a lower portion 292' of smaller diameter, with the upper portion 290' tapering inwardly toward the lower portion 292. The diameter of the upper portion 284' of valve shaft 272' is larger than the diameter of lower portion 292' of aperture 282' so as to prevent upward movement of plug 254' along shaft 272'.

The upper surface of valve plug 254' is provided with an upwardly extending annular collar 360 having a pair of aligned holes 362, 364 which align with a hole 366 through the shaft 272' to receive a pin 368 or other fastener to retain the plug 254' against upward movement relative to shaft 272'. Preferably, the pin 368 is tightly received against movement in the hole 366 of shaft 272' and is loosely received in the holes 362, 364 of collar 360. This permits some limited movement of plug 254' normal to the shaft 272' to provide self-centering. As more clearly shown in FIG. 12, the pin 368 is preferably in the form of a split cylinder and is somewhat radially compressed in hole 366 so as to provide a tight connection to the shaft 272'.

FIG. 11 illustrates yet another variation in which an upper plug 254" is secured to a valve shaft 272" by a pin 368. The valve shaft 272" has an upper large diameter portion 284", a lower small diameter portion 286" and a radial shoulder 288" extending between the upper and lower portions 284", 286". The shaft 272" is similar in appearance to shaft 272 described above except that there is a smoothly curved transition 289 between the radial shoulder 288" and the upper large diameter portion 284" of shaft 272".

The central aperture 282" of plug 254" is provided with a larger diameter upper portion 290" and a smaller diameter lower portion 292" with a radial shoulder 294" extending between upper and lower portions 290", 292". The shaft 272" is loosely received in the aperture 282" to permit self-centering of the valve seat 254". Also, a smoothly curved transition 293 is provided between the shoulder 294" and the upper portion 290" of aperture 282". The curved transitions 289, 293 of the respective shaft 272" and aperture 282" engage one another and also assist in self-centering of the plug 254".

It will be seen from FIG. 11 that the radial shoulder 294" of central aperture 282" is provided with a notch 295 in which is received a resilient O-ring 297 to provide a seal between the shaft 272" and the plug 254", to substantially prevent flow of fluid between the shaft 272" and plug 254" when the valve is closed.

The upper plug 254" of FIG. 11 is provided with an upwardly extending annular collar 360' having a pair of aligned holes 362', 364' which align with a hole 366' through the shaft 272" to receive a pin 368 or other fastener to retain the plug 254" against upward movement relative to shaft 272". Preferably, the pin 368 is tightly received against movement in the hole 366' of shaft 272" and is loosely received in the holes 362', 364' of collar 360' to provide self-centering. The pin 368 is preferably in the form of a split cylinder as shown in FIG. 12 and is preferably radially compressed in hole 366' so as to provide a tight connection to the shaft 272".

In addition, the large diameter portion 284' of shaft 272' may be provided with an outwardly extending protrusion, such as C-clip 370 retained in groove 372. The C-clip 370 is positioned intermediate the plug 254 and the top wall 206 and may preferably be received against top wall 206 when the valve is in the open position as shown in FIG. 7, thereby helping to limit upward movement of shaft 272'. The C-clip 370 may preferably be coated on its upper surface by a resilient material such as rubber (not shown), thereby lessening valve noise caused by engagement of the plug 254 and the top wall 206. As mentioned above, the shaft 272' may be surrounded by a coil spring, similar to spring 110 described above, extending between the C-clip 370 and the top wall 206. This would dampen upward movement of the valve shaft 272' and plug 254 during valve opening, as described above with reference to valve 10.

Figure 13:
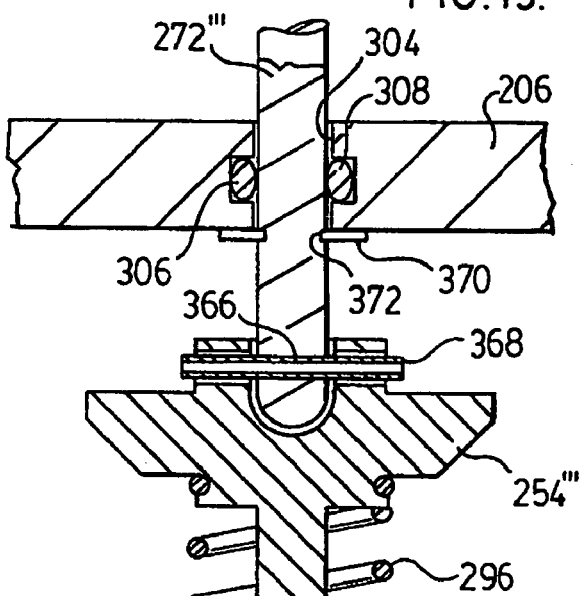
FIG. 13 illustrates a preferred upper valve plug according to the invention.

FIG. 13 illustrates another arrangement which prevents leakage between the upper plug and the valve shaft of valve 200. In the embodiment of FIG. 13, the valve plug 254 is replaced by a valve plug 254''' which has a central cylindrical depression 78" similar to that of valve plug 50' shown in FIG. 2B, but is otherwise similar to plug 254", being secured to the shaft 272''' by pin 368. The valve shaft 272''' has a lower end 76" which is received in the depression 78". Rather than having shaft 272''' extend through the upper plug 254''', the upper plug 254''' is provided with a downward extension portion 255 which is received in the cylindrical depression 278 of the lower plug 256. The coil spring 296 surrounds extension portion 255, similar to the arrangement shown in FIG. 7. It can be seen that closing of a valve 200 having this arrangement will reduce leakage over the embodiment of FIG. 7 due to elimination of the shaft-receiving aperture 282 in plug 254.

Figure 14:
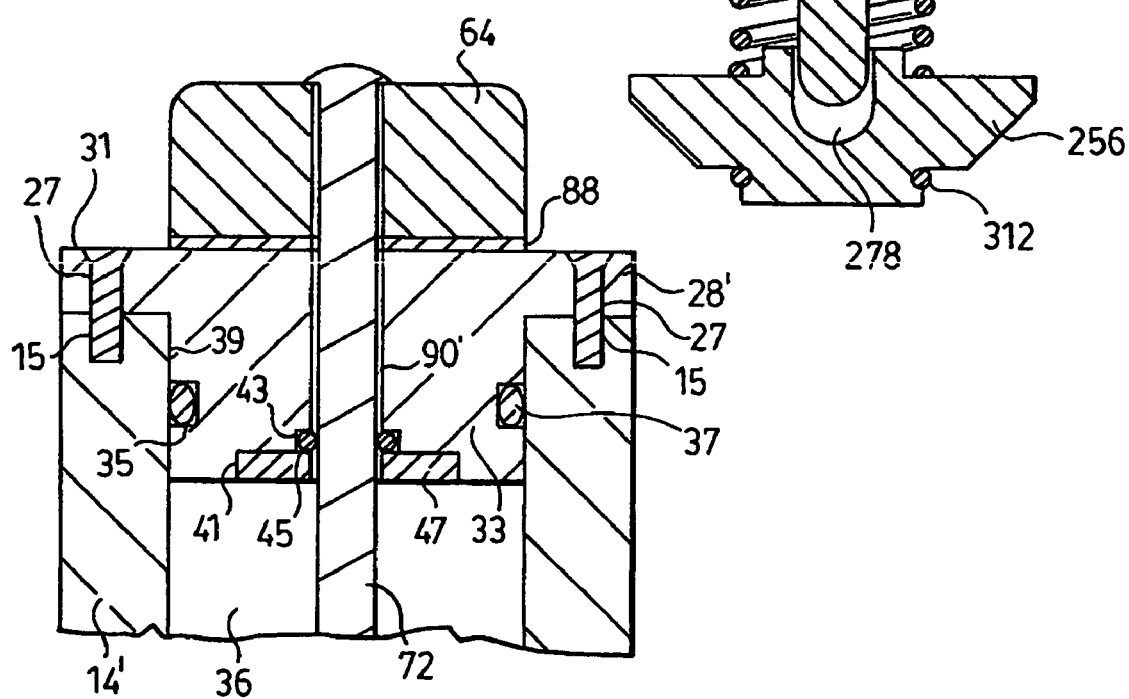
FIG. 14 illustrates an alternate means for attaching the top wall to the housing.

FIG. 14 illustrates an alternate means of securing the top wall to the housing in a valve according to the invention. FIG. 14 comprises a cross-sectional end view of a portion of a single seat valve similar to valve 10 and having a housing 14' closed by a top wall 28', a valve shaft 72 extending through a central aperture 90' in the top wall 28' and a solenoid 64 secured to an upper surface of the top wall 28', with a seal between the top wall 28' and solenoid 64 being provided by a gasket 88. As illustrated, the top wall 28' is provided with a flange 31 having a plurality of countersunk vertical apertures 27 which are aligned with a plurality of vertical apertures 15 in the housing 14', the aligned apertures 15, 27 receiving screws 25 to secure the top wall 28' to the housing 14'. As shown in dotted lines in FIG. 5, the top wall 28' is preferably secured to the housing 14 by four screws 25.

The top wall 28' of FIG. 14 also has a cylindrical extension 33 which extends downwardly into the interior chamber 36'. The cylindrical extension has a side wall 39 provided with a groove 35 in which is received a resilient O-ring 37 to provide a seal between the housing 14' and top wall 28'. The shaft 72 is sealed relative to the central aperture 90' of top wall 28' by an arrangement similar to that shown in FIG. 8. The aperture 90' in the top wall 28' has a stepped arrangement with a lower portion 41 of large diameter and an intermediate portion 43 having a diameter less than that of lower portion 41 and greater than that of the remainder of aperture 90'. A resilient O-ring 45 is received inside the intermediate portion 43 and is retained by an annular washer 47 or the like which is received in the relatively shallow lower portion 41.

FIGS. 15 to 20 illustrate yet another preferred two-seat valve 400 similar to that illustrated in FIG. 7 and having a valve plug/valve shaft construction similar to that shown in FIG. 13. Valve 400 comprises a valve body 402 having a housing 404 with an integral bottom wall 407 and enclosed by a top wall 406. The top wall 406 is secured to the housing 404 by a plurality of fasteners, such as screws 408 (FIG. 19) and is sealed to the housing 404 by a resilient O-ring 410 received in an annular groove 412 in the top wall 406. It will, however, be appreciated that the top wall 406 is not necessarily attached to the housing 404 by the specific means shown in the drawings. For example, the top wall 406 may comprise a threaded fitting, similar to union fitting 29 described above, which is received in a threaded opening in the housing 404. Alternatively, the groove 412 in which the O-ring 410 is received may be formed in the housing 404 rather than the top wall 406.

Attached to the housing 404 are inlet and outlet fittings 414, 416 which may preferably be similar in configuration to the fittings 22, 20 described above. Preferably, the inlet and outlet 414, 416 of valve 400 are in alignment with one another along an axis D, such that fluid flows generally normal to the axis D from inlet 414 to outlet 416 through the interior chamber 418 of the valve body 402 as indicated by arrows X and Y in FIG. 15.

The interior chamber 418 is preferably divided into two portions, an inlet portion 420 which is in direct communication with inlet 414 and an outlet portion 422 which is in direct communication with the outlet 416.

Figure 15:
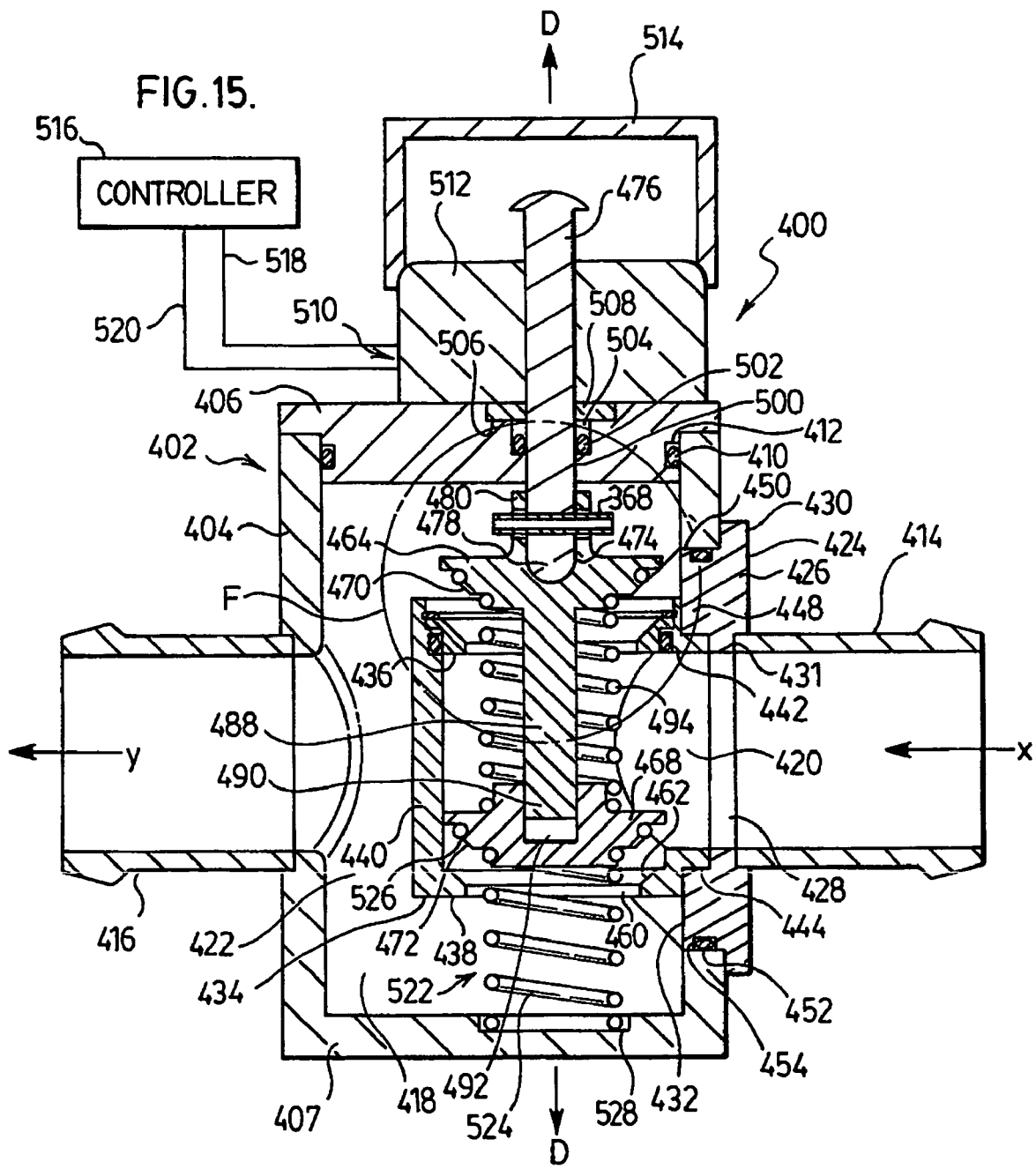
FIG. 15 is a cross-sectional side view of a leak-resistant solenoid valve according to yet another preferred embodiment of the invention in the open configuration.

The inlet portion 420 of interior chamber 418 is defined by a removable fitting block 424 which forms part of the valve body 402. The fitting block 424 comprises an exterior portion which is located outside the interior chamber 418, an attachment portion by which the fitting block 424 is attached to the housing 404 and an interior portion which is received inside the interior chamber 418. In the valve 400 shown in the drawings, the exterior portion of fitting block 424 comprises the inlet fitting 414. The attachment portion comprises an attachment flange 426 having a central aperture 428 through which the inlet 414 communicates with the inlet portion 420 of interior chamber 418. The attachment flange 426 has an outer face 430 with an annular groove 431 surrounding the aperture, with the inlet fitting 414 being received in the groove 431. The attachment flange 426 also has an inner face 432 having an annular groove 444 surrounding the aperture 428. Attached to the inner face 432 is a valve seat fitting 434 comprising an upper valve seat 436, a lower valve seat 438 and a peripheral side wall 440 extending along axis D between the upper and lower valve seats 436, 438 and surrounding the valve seats 436, 438 so as to separate the inlet portion 420 from the outlet portion 422 of interior chamber 418. As shown in FIG. 15, the valve seat fitting 434 includes a cylindrical portion 442 which fits inside cylindrical groove 444. Although the fitting block 424 is illustrated as comprising separate sections 414, 426 and 434 which are preferably attached by brazing, it will be appreciated that the sections of fitting 424 may instead be integrally formed as a single unit.

As best seen in the close-up of FIG. 15A, the upper valve seat 436 has an inner axial wall 456 and an angled sealing surface 458. Similarly, the lower valve seat 438 has an axial inner wall 460 and an angled sealing surface 462. As with the previous embodiments, the sealing surfaces 458, 462 are preferably angled by about 45° relative to axis D.

The lower valve seat 438 is preferably integrally formed as part of the valve seat fitting 434, whereas the upper valve seat 436 is preferably separately formed and inserted into an opening in the top of the valve seat fitting 434. This facilitates assembly of the valve 400. As shown in the close-up view of FIG. 15A, the side wall 440 of valve seat fitting 434 has an inner face 536 with an inwardly extending shoulder 538. The upper valve seat 436 has an outwardly extending radial projection 540 which is received between the shoulder 538 and a retaining clip 542, the outer edge of which is received in a first annular groove 544 in the inner face 536. A fluid-tight seal between the upper valve seat 436 and the valve seat fitting 434 is provided by a resilient O-ring 546 received inside a second annular groove 548 of the inner face 536.

Figure 18:
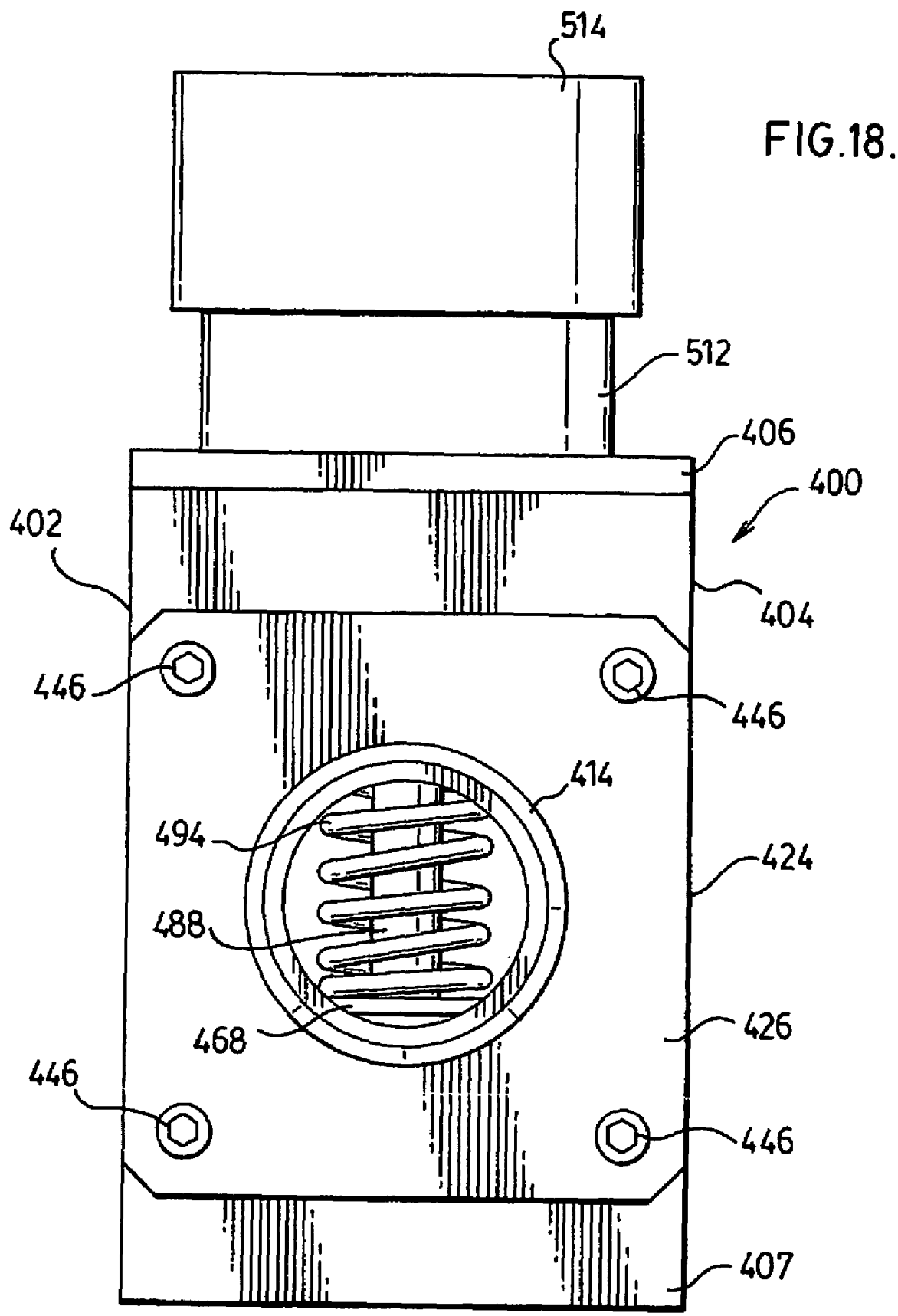
FIG. 18 is a front elevation view of the valve of FIG. 15.
Figure 19:
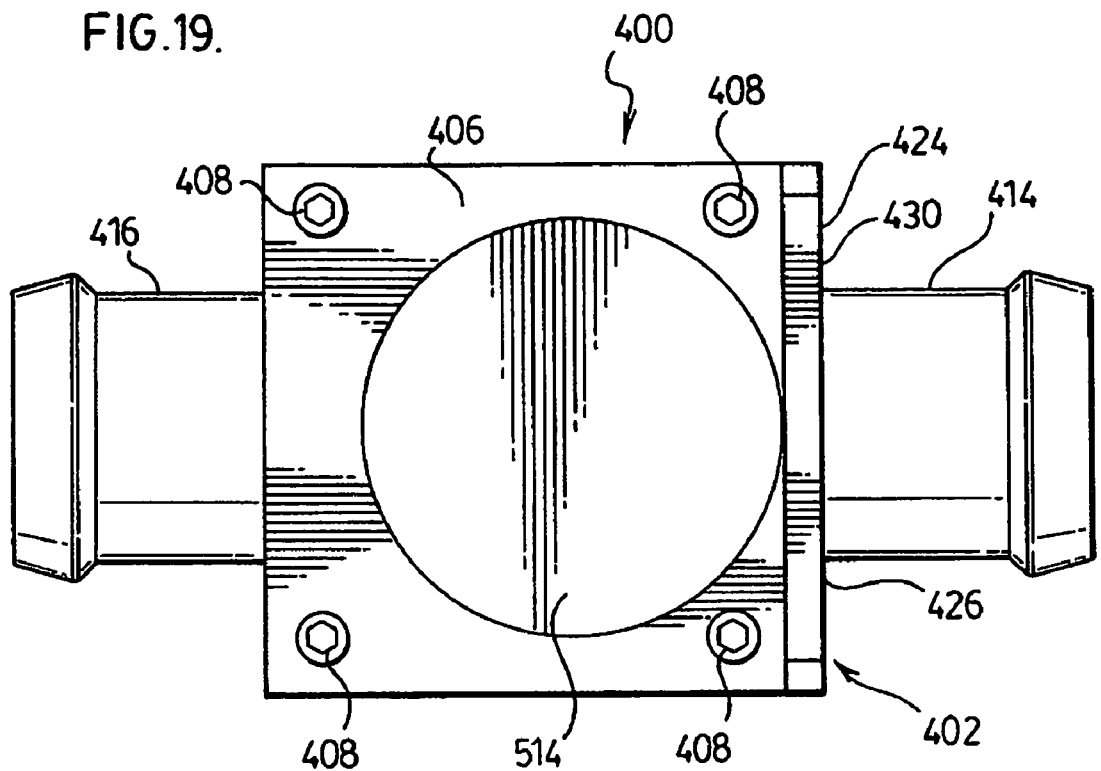
FIG. 19 is a top plan view of the valve of FIG. 15.
Figure 20:
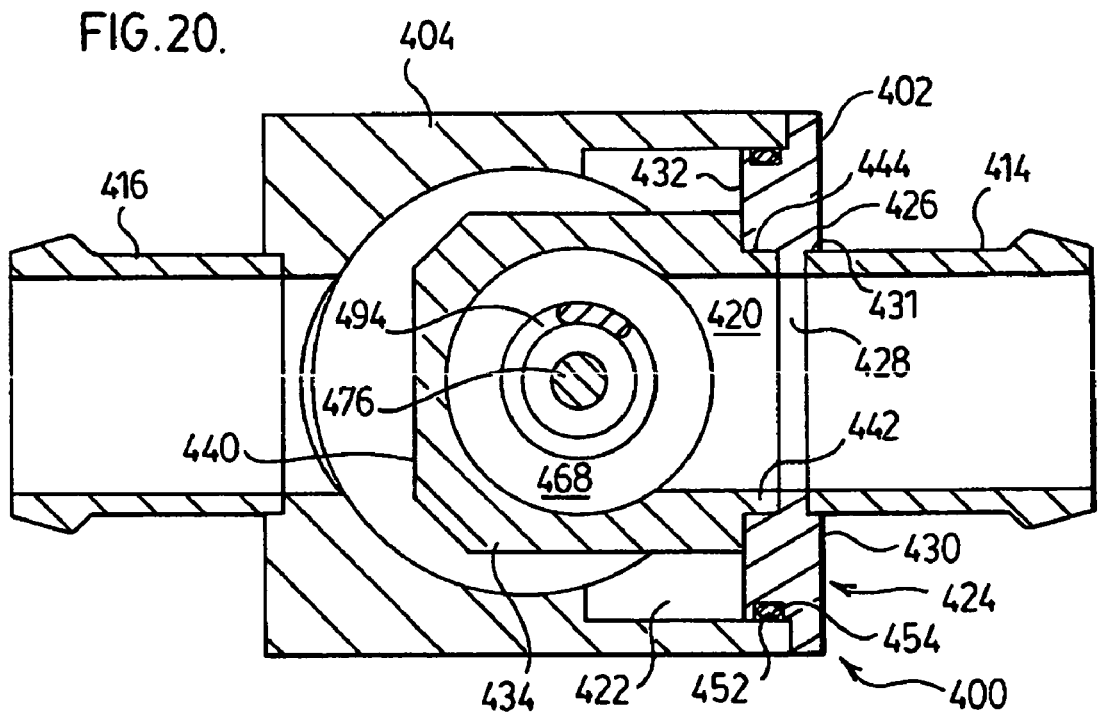
FIG. 20 is a cross-section along line XX–XX' of FIG. 17.

As illustrated in FIG. 18, the attachment flange 426 is secured to the outside of housing 404 by a plurality of fasteners, such as screws 446. In order to seal the connection with housing 404, the flange 426 is provided with a cylindrical portion 448 which is received in an opening 450 of the housing. A seal is preferably formed between the attachment flange 426 and the housing 404 by an O-ring 452 which is received inside a groove 454 in the cylindrical portion 448 of the attachment flange 426. It will, however, be appreciated that the O-ring may instead be received inside a groove (not shown) in the sides of opening 450 of housing 404.

The valve 400 further comprises a pair of valve plugs 464, 468 provided with annular sealing surfaces 470, 472, respectively for sealing with the upper and lower valve seats 436, 438. The valve plugs 464, 468 are preferably similar in structure to the upper and lower valve plugs 254''' and 256 illustrated in FIG. 13. The upper valve plug 464 has a central cylindrical depression 474 in which the lower end 478 of valve shaft 476 is received. As shown in FIG. 15A, the upper valve plug 464 is provided with an upwardly extending annular collar 480 having a pair of aligned holes 482, 484 which align with a bore 486 through the lower end 478 of valve shaft 476 to receive a pin 368 or other fastener to retain the plug 464 against upward movement relative to the shaft 476. This is similar to the arrangement shown in FIG. 7. Preferably, the pin 368 is tightly received against movement in the bore 486 of shaft 476 and is loosely received in the holes 482, 484 of collar 480. This permits some limited movement of plug 464 normal to the shaft 476 to provide self-centering. As in FIG. 13, both the lower end 478 of valve shaft 476 and the cylindrical depression 474 in the upper plug 464 are provided with rounded surfaces.

Figure 16:
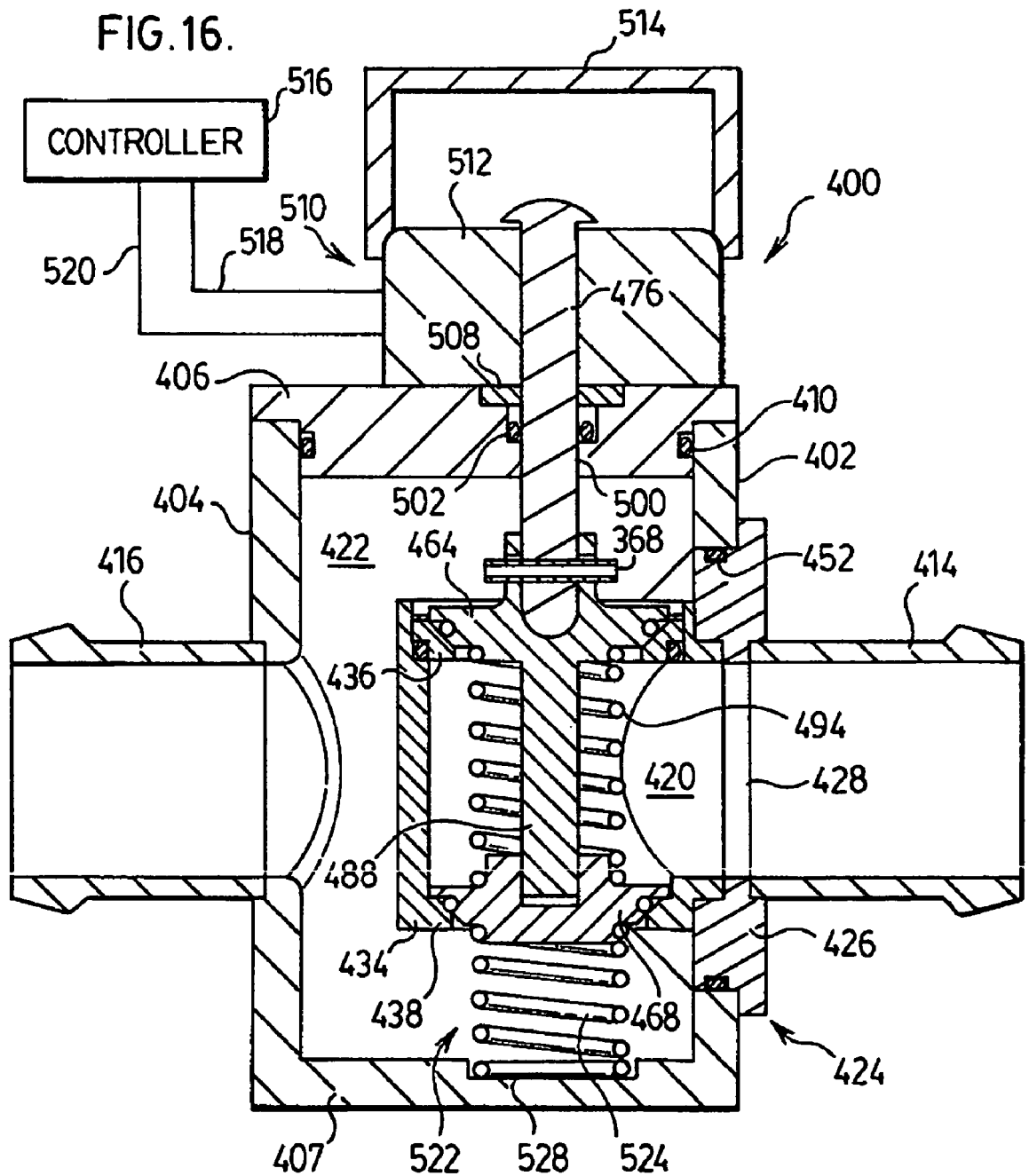
FIG. 16 shows the valve of FIG. 15 in the closed configuration.

As also shown in FIG. 15A, the sealing surface 470 of upper valve plug 464 is angled relative to axis D so as to engage the angled sealing surface 458 of the upper valve seat 436. The sealing surface 470 is preferably provided with an annular groove 451 in which is received a resilient O-ring 453. As shown in FIG. 16, both the resilient O-ring 453 and the sealing surface 470 of plug 464 engage the sealing surface 458 of the upper valve seat 436 when the valve 400 is closed.

The upper valve plug 464 is provided with an axially extending portion 488 which extends downwardly and has a lower end 490 received in a cylindrical depression 492 of the lower valve plug 468. The valve plugs 464 and 468 are preferably biased away from one another by a coil spring 494 having an upper end received in a groove 496 (FIG. 15A) adjacent the sealing surface 470 of upper plug 464 and having a lower end which extends over an upstanding collar on the upper surface of the lower plug 468.

In the open configuration of valve 400 shown in FIG. 15, the lower end 490 of extension portion 488 is not fully seated inside the cylindrical depression 492. That is, a gap exists between the lower end 490 of extension portion 488 and the bottom wall of the depression 492. As will be seen in the drawings, this permits the distance between the upper and lower plugs 464, 468 to be varied by a limited amount during opening and closing of valve 400. As explained above with reference to FIG. 7, permitting plugs 464, 468 to move axially relative to one another by a limited amount assists in providing effective seals with the two valve seats 436, 438. As shown in the drawings, the lower end 490 of extension portion 488 has a flat bottom, as does the cylindrical depression 492. It will, however, be appreciated that the lower end 490 of extension portion 488 and the cylindrical depression 492 may be rounded as in FIG. 13.

The valve shaft 476 extends through an aperture 500 in the top wall 406 of the valve body 402. A sliding seal between shaft 476 and aperture 500 is provided by a resilient O-ring 502 seated in an annular groove 504 formed in the axially extending wall of aperture 500. As in FIG. 8, the groove 504 is formed by providing aperture 500 with a stepped arrangement, having an upper portion 506 of relatively large diameter such that a washer 508 received in the upper portion 506 retains the O-ring.

As in the valves described above, valve 400 is provided with a plug actuating mechanism for moving the valve plugs 464, 468 along the axis D from the opened position to the closed position, and a biasing mechanism for biasing the plugs 464, 468 toward the open position.

The plug actuating mechanism is generally identified by reference numeral 510 and comprises a solenoid 512, the top of which may preferably be covered by top cap 514. The solenoid 512 may, for example, comprise an on-off solenoid or a proportionately controlled solenoid. In preferred valve 400, solenoid 512 is an on-off solenoid. An external controller 516 is provided for intermittently energizing the solenoid 512 with an electric current, and electrical conductors 518, 520 are provided through which the current flows between the controller 516 and the solenoid 512. As in the previous embodiments, the upper end of valve shaft 476 is engaged by the solenoid 512, such that when the solenoid 512 is energized by an electrical current, the valve shaft 476 moves downwardly along axis D. Since the valve plugs 464 and 468 are carried by the valve shaft 476, energizing solenoid 512 causes the valve plugs 464, 468 to move toward the respective valve seats 436, 438.

The biasing mechanism of valve 400 is generally identified by reference numeral 522 and preferably comprises a coil spring 524 having an upper end and a lower end. The upper end of spring 524 is retained by a groove 526 in the lower surface of the lower valve plug 468 and the lower end of spring 524 is seated in a cylindrical depression 528 in the bottom wall 407 of housing 404.

Operation of valve 400 is substantially identical to the operation of valve 200 described above, with the open configuration of valve 400 being shown in FIG. 15 and the closed configuration being shown in FIG. 16. As in valve 200, energizing the solenoid 512 results in downward movement of the shaft 476 and the associated valve plugs 464, 468. The lower valve plug 468 preferably seats against the lower valve seat 438 before the upper plug 464 contacts the upper valve seat. As in the embodiment described above, the axial distance between the upper valve plug 464 and the upper valve seat 436 is from about 0.5 to about 1 mm greater than the axial distance between the lower valve plug 468 and the lower valve seat 438. Downward movement of the shaft 476 then continues with the lower end 490 of extension portion 488 approaching the bottom of cylindrical depression 492, until the upper plug 464 seals against the upper valve seat 436. As shown in FIG. 16, it is preferred that the depth of depression 492 is sufficient that a small clearance exists between the bottom wall of depression 492 and the lower end 490 of extension portion 488, even when the valve 400 is completely closed. This helps to ensure that both plugs 464 and 468 are effectively seated.

Discontinuing the flow of electrical current to solenoid 512 will then permit expansion of springs 494 and 524, thereby moving the plugs 464, 468 upwardly out of engagement with the valve seats 436, 438 and restoring fluid flow through the valve 400.

Figure 17:
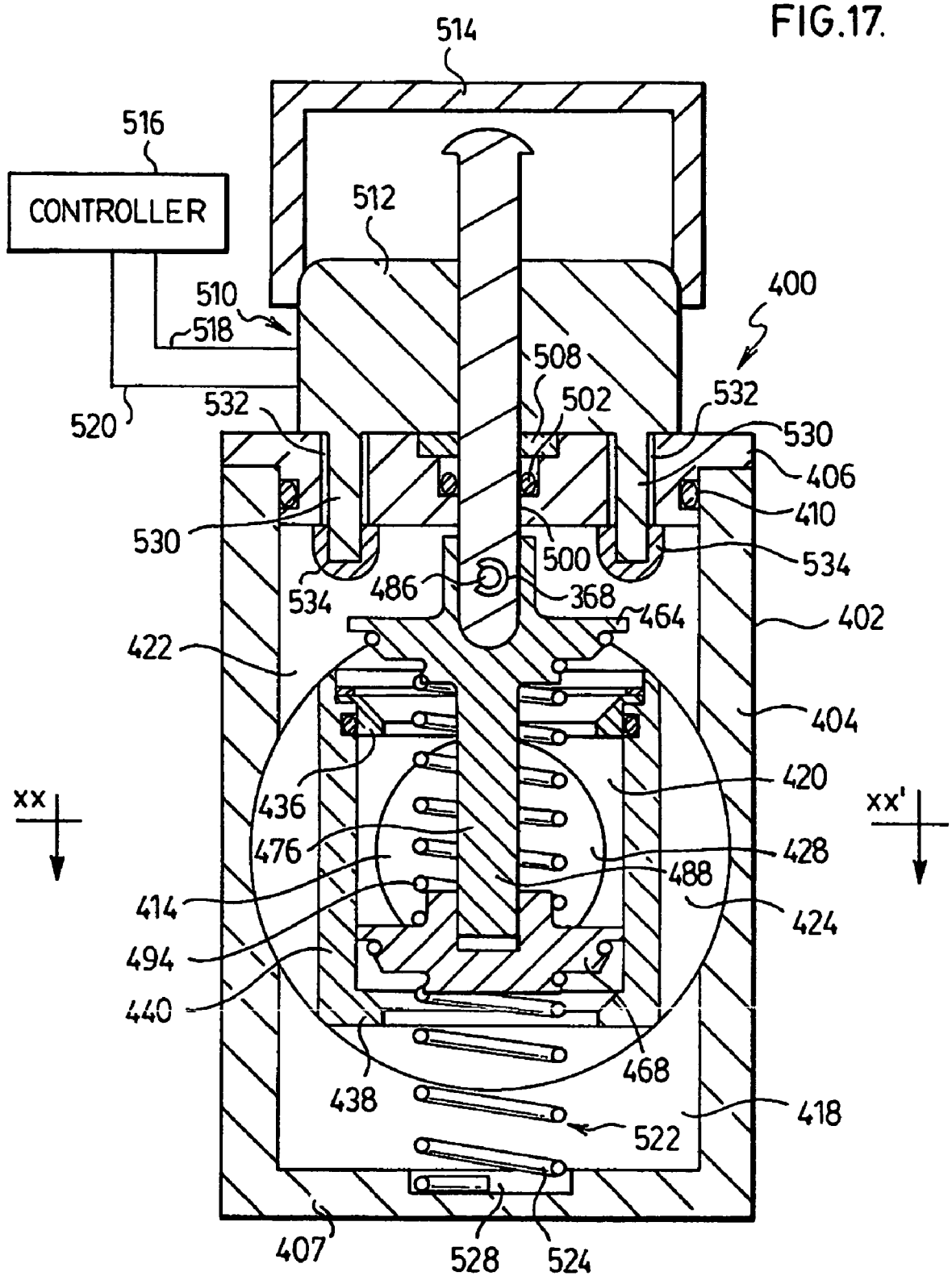
FIG. 17 is a cross-sectional front view showing the valve of FIG. 15.

As with valve 10 described above, the solenoid 512 of valve 400 may preferably be provided with studs 530 (FIG. 17) which extend through apertures 532 in top wall 406 and which engage threaded dome nuts 534 in the interior chamber 418. A gasket (not shown) may preferably be provided between solenoid 512 and top wall 406 to provide a fluid-tight seal. Although a specific means for attaching the solenoid 512 to the top wall 406 is illustrated in FIG. 17, it will be appreciated that the solenoid 512 may be integrally formed with the top wall 406 of the valve body 402.

Figure 21:
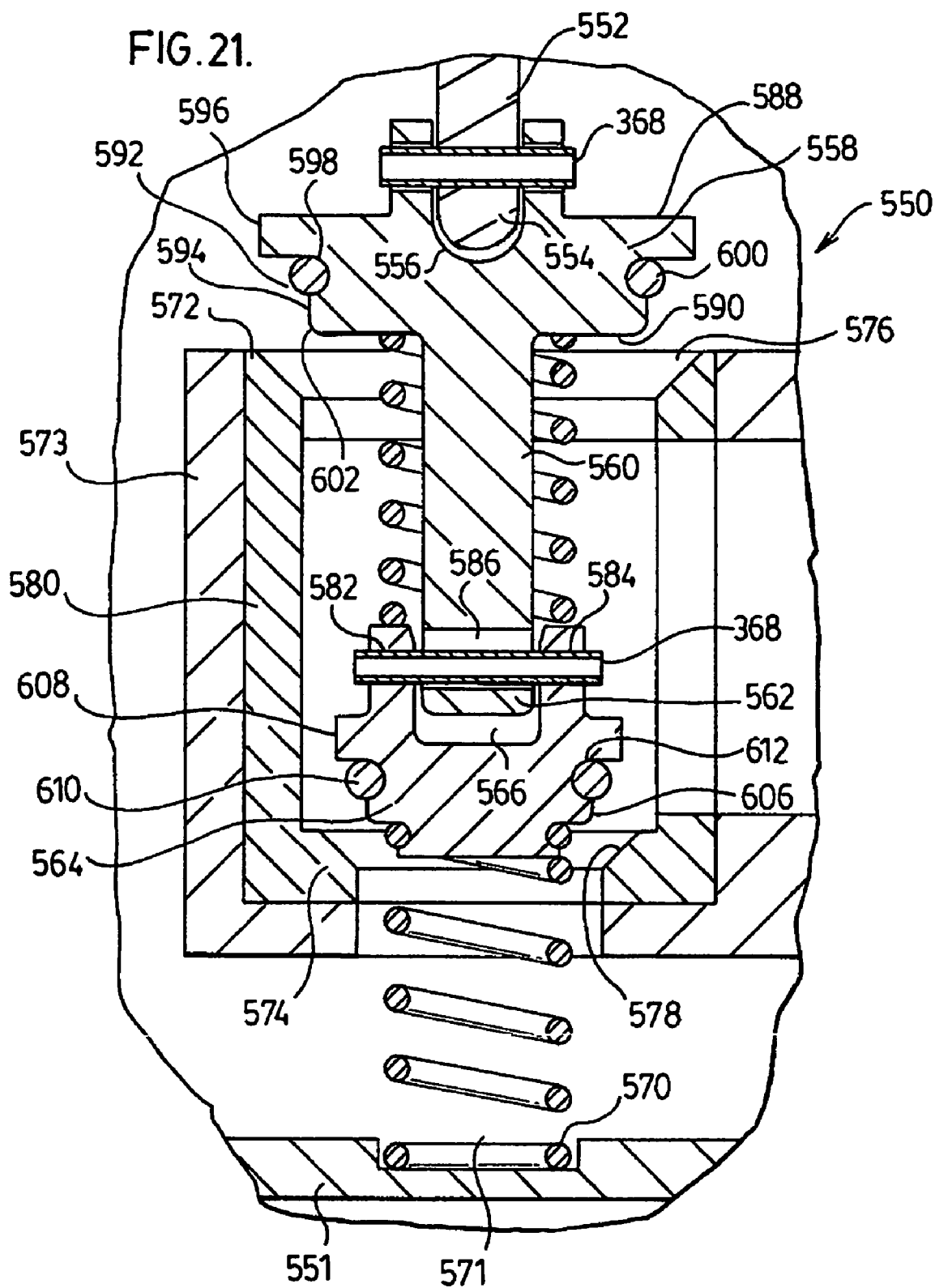
FIG. 21 is a cross-sectional side view showing part of a two-seat valve having an alternate valve plug and valve seat construction, the valve being shown in the open configuration.
Figure 22:
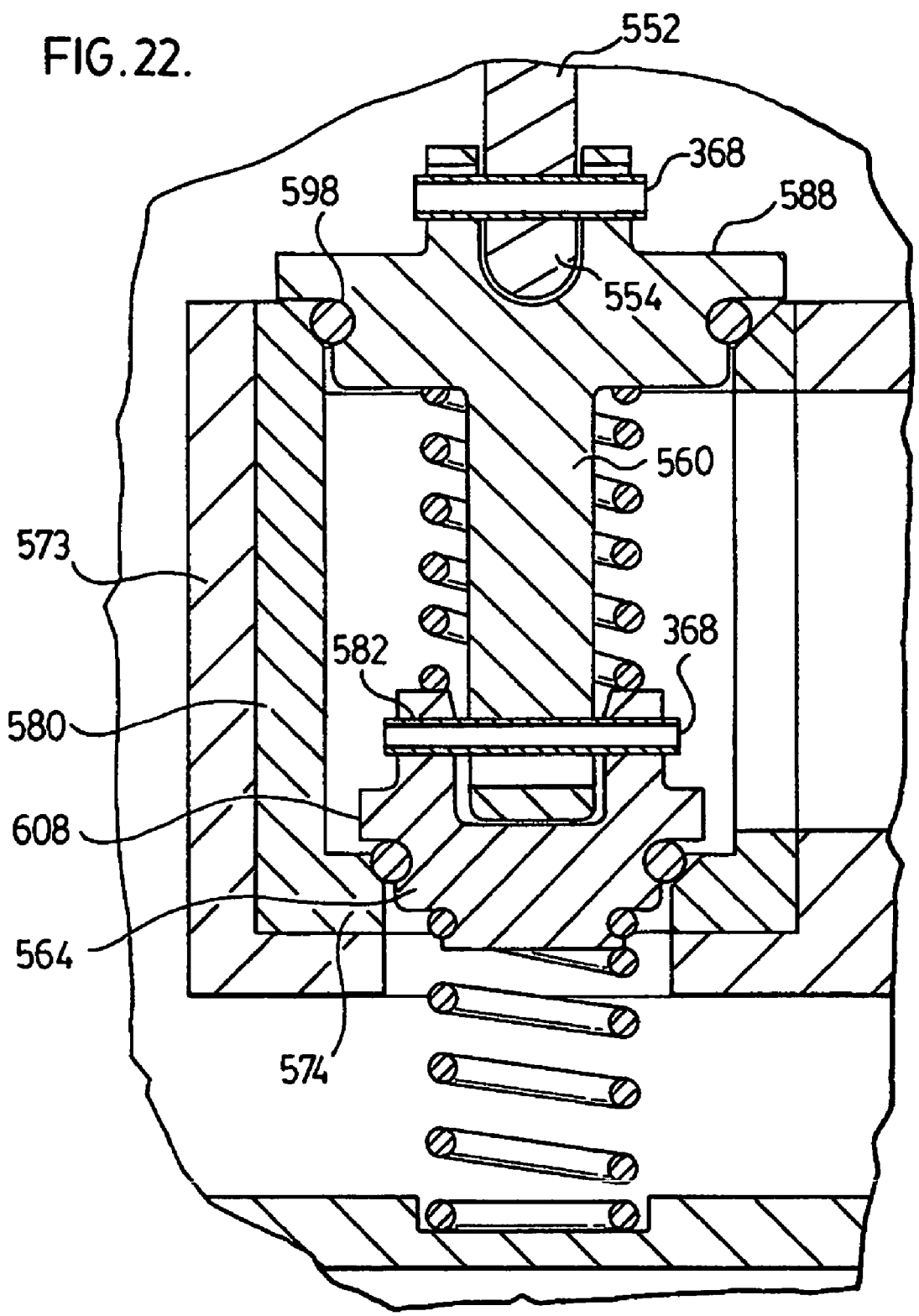
FIG. 22 is a cross-sectional side view of the valve of FIG. 21 in the closed configuration.

FIGS. 21 and 22 illustrate yet a further preferred embodiment of the present invention. These drawings illustrate a portion of a two-seat valve 550 similar in construction to that shown in FIGS. 15 to 20. FIGS. 21 and 22 illustrate only those portions of valve 550 which are necessary to explain its distinct features. The valve body of valve 550, of which only the bottom wall 551 is shown, may preferably be the same as that shown in FIG. 7, or may preferably be of the type having a fitting block such as that described above with reference to FIGS. 15 and 20.

The valve 550 comprises a valve shaft 552 having a rounded lower end 554 which is received inside a round-bottomed, cylindrical depression 556 formed in the upper surface of upper valve plug 558. The upper valve plug 558 is secured to the lower end 554 of valve shaft 552 by pin 368 in an identical manner to that shown in FIG. 15.

The upper valve plug 558 has an extension portion 560 extending axially downwardly and having a lower end 562 which is received in a cylindrical depression 566 of lower valve plug 564. The lower surface of lower plug 564 is provided with a groove to receive the upper end of a coil spring 570. The lower end of spring 570 is preferably seated in a cylindrical depression 571 in the bottom wall 551.

In the open configuration shown in FIG. 21, the upper and lower valve plugs 558, 564 are spaced from the respective upper and lower valve seats 572, 574. The valve seats 572, 574 have angled sealing surfaces 576, 578 and are located in an inner wall 573 which separates the interior chamber into inlet and outlet portions. This wall 573 may preferably form part of a fitting block similar to that shown in FIGS. 15 to 20.

As in the previous embodiments, the valve shaft 552 is driven downward by a solenoid. Typically, such solenoids are one-way solenoids which move the valve shaft 552 only in the downward direction against the force of spring 570. The downward force provided by such a solenoid is typically weak at the beginning of the down stroke and therefore the coil spring 570 must also be weak to permit the valve 550 to close. In some cases, the spring 570 may not be sufficiently strong to open the valve 550 once the solenoid is de-energized.

The valve shown in FIGS. 21 and 22 overcomes this problem in two ways, explained below.

Firstly, the upper plug 558 has a greater circumference, and therefore a greater surface area, than the lower plug 564. Thus, when the valve is closed as in FIG. 22, the pressure of fluid entering the inlet of the valve tends to push the upper valve plug 558 in the upward direction, thereby assisting in opening the valve. Secondly, the lower plug 564 is secured to the lower end 562 of extension portion 560 by a pin 368 in order to prevent complete withdrawal of the extension portion 560 from the cylindrical depression 556 during opening of the valve 550.

In addition to facilitating opening of the valve 550, the above features also facilitate assembly of the valve 550. Specifically, due to the enlargement of the upper plug 558, the upper valve seat 572 is of a greater diameter than the lower valve seat 574 and the lower valve plug 564. Therefore, the valve can be assembled by inserting the lower valve plug 564 downwardly through the upper valve seat 572. Preferably, the solenoid, shaft 552, plugs 558 and 564, cover (not shown) and spring 570 are pre-assembled and inserted into the valve body.

The enlargement of the upper valve seat also eliminates the need to provide a separately formed upper valve seat as in FIGS. 15 to 20, and permits both valve seats to be integrally formed with the housing, with a fitting block, or as a bushing 580 which can be inserted into the housing. This also simplifies assembly of the valve 550.

As shown in the drawings, the lower valve plug 564 is pinned to the extension portion 560 by a pin 368 which is tightly received in aligned openings 582, 584 of the lower plug 564 and loosely received in a bore 586 of the extension portion 560. This permits a limited amount of relative axial movement between the upper and lower valve plugs 558, 564 which, as described above with reference to FIGS. 7 and 15, assists in providing seals between the plugs and the valve seats.

The valve plugs 558, 564 of valve 550 are also configured to provide enhanced sealing with the upper and lower valve seats 572, 574. In this regard, the upper valve plug 558 has a generally flat upper surface 588, a flat lower surface 590 surrounding extension portion 560, and a generally axially extending side wall 592 extending between the upper and lower surfaces 588, 590. The side wall 592 has a lower portion 594 of relatively small diameter and an upper portion 596 of relatively large diameter, with an annular groove 598 being provided between the upper and lower portions 596, 594 to receive a resilient O-ring 600. As can be seen from FIG. 22, the diameter of lower portion 594 is smaller than the inside diameter of upper valve seat 572, thereby permitting the lower portion 594 of side wall 592 to become received inside the upper valve seat 572. This assists in guiding the upper valve plug 558 into sealing engagement with the upper valve seat 572 during closing of the valve.

Preferably, the edge connecting side wall 592 and lower surface 590 of plug 558 is chamfered at 602 to help guide the plug 558 into the seat 572.

Furthermore, it will be appreciated that forming the upper portion 596 of side wall 592 with a greater diameter will help prevent O-ring 600 from becoming displaced from groove 598 by fluid passing through the valve 550. The diameter of the upper portion 596 of side wall 592 is greater than the inner diameter of valve seat 572 so as to prevent the plug 558 from completely passing through valve seat 572. When closed, the O-ring seals against the sloped sealing surface of the valve seat 572 as shown in FIG. 22.

For similar reasons, the lower valve plug 564 is provided with a side wall having a smaller diameter lower portion 606 and a larger diameter upper portion 608, with a resilient O-ring 610 being received in a groove 612 between the lower and upper portions 606, 608.

The terms "upper" and "lower" are used herein to describe the relative positions of various valve components as shown in the drawings. It is to be understood that these terms are used for convenience only and that the valves according to the invention are not restricted to use in any particular orientation.

Although the invention has been described in relation to valves which can be used to control coolant flow in automotive applications, it will be appreciated that the valves according to the invention can be used in a wide variety of other applications. For example, valves according to the invention can be used in low-end stationary industrial or commercial cooling systems, for example small stationary power generation units which may be fuel cell based, liquid cooled generator sets, recreational vehicle applications, etc.

Although the valves described above have been described as having a preferred direction of fluid flow, i.e. from the inlet to the outlet, it will be appreciated that it may be preferred in some cases to reverse the direction of flow so that the fluid flows from the outlet to the inlet.

Although the invention has been described in connection with certain preferred embodiments, it is not limited thereto. Rather, the invention includes within its scope all embodiments which may fall within the scope of the following claims.

What is claimed is:

1. A valve comprising:
   (a) a valve body having an interior chamber, an inlet and an outlet;
   (b) a pair of valve seats provided in the interior chamber of the valve body, the valve seats being spaced from one another along an axis, each of the valve seats having a sealing surface;
   (c) a pair of valve plugs provided in the interior chamber of the valve body, the valve plugs being spaced from one another along the axis, each of the valve plugs having a sealing surface and being movable along the axis between an open position and a closed position, wherein the sealing surfaces of the plugs and the seats are spaced from one another in the open position and wherein each of the plugs sealingly engages one of the seats along their respective sealing surfaces in the closed position, and wherein the inlet and the outlet are spaced from one another in a direction normal to the axis and are in flow communication with one another through the interior chamber with the plug in the open position;
   (d) a plug actuating mechanism for moving the valve plugs along the axis from the open position to the closed position; and (e) a first biasing mechanism for biasing the plugs axially toward the open position;

wherein the valve body comprises a fitting block and a housing; wherein the valve outlet is provided in the housing and the valve inlet is provided in the fitting block; wherein the fitting block and the housing are separately formed; and the fitting block comprises an exterior portion located outside the interior chamber of the valve body, an attachment portion by which the fitting block is attached to the housing, and an interior portion which is received inside the interior chamber;

wherein the attachment portion of the fitting block comprises an attachment flange to which the exterior portion and the interior portion of the fitting block are both attached, the attachment flange having an aperture through which the valve inlet communicates with the interior chamber of the valve body;

wherein the attachment flange is sealingly secured to an outside surface of the housing; and wherein the exterior portion, the attachment portion and the interior portion of the fitting block are sequentially arranged.

2. The valve of claim 1, wherein the inlet is in communication with an inlet chamber located in the interior chamber of the valve body, the inlet chamber having a pair of aligned openings, each of which is surrounded by one of the valve seats, such that with the valve plugs in their closed positions the inlet chamber is substantially sealed from the outlet.

3. The valve of claim 1, wherein an axial distance between the sealing surfaces of the valve seats is fixed and wherein an axial distance between the sealing surfaces of the valve plugs is variable.

4. The valve of claim 1, wherein the plug actuating mechanism comprises a solenoid.

5. The valve of claim 4, wherein the solenoid, when energized by an electric current, causes both valve plugs to move toward the closed position.

6. The valve of claim 5, wherein the first biasing mechanism causes both valve plugs to move toward their open positions when the electric current to the solenoid is discontinued.

7. The valve of claim 4, wherein the plug actuating mechanism further comprises a valve shaft through which the solenoid acts on the valve plugs, the valve shaft having upper and lower axially spaced ends and being reciprocally movable along the axis.

8. The valve of claim 7, wherein the upper end of the valve shaft is engaged by the solenoid, the lower end of the valve shaft is received in a depression in a lower one of the valve plugs, and wherein an upper one of the valve plugs is received on the valve shaft intermediate its upper anf lower ends, the valve shaft extending through an aperture in the upper valve plug.

9. The valve of claim 8, further comprising a second biasing mechanism for biasing the valve plugs away from one another along the axis.

10. The valve of claim 9, wherein the second biasing mechanism comprises an axially-extending coil spring surrounding the shaft and received between the upper and lower valve plugs.

11. The valve of claim 10, wherein the lower end of the valve shaft is displaceable relative to lower valve plug by a predetermined amount and wherein a distance between the sealing surfaces of the upper and lower valve plugs is greater in the open position than in the closed position.

12. The valve of claim 11 wherein, during closing of the valve, the lower valve plug contacts a lower one of the valve seats before the upper valve plug contacts an upper one of the valve seats. to the axis.

13. The valve of claim 9, wherein the upper one of the valve plugs is prevented from moving upwardly along the valve shaft by a retainer mechanism provided on the valve shaft between the upper plug and a top wall of the valve body.

14. The valve of claim 13, wherein the valve shaft has an upper portion of a first diameter and a lower portion of a relatively smaller second diameter, with a radial shoulder being provided between the upper and lower portions of the shaft, and wherein the upper valve plug has a central aperture through which the valve shaft extends, the central aperture having a radial shoulder which engages the radial shoulder of the shaft to prevent upward movement of the upper valve plug relative to the shaft.

15. The valve of claim 8, wherein relative diameters of the valve shaft, the aperture in the upper valve plug and the depression in the lower valve plug are such that one or both of the valve plugs are displaceable by a small amount normal 16. The valve of claim 8, wherein a resilient sealing element is provided between the upper valve plug and the valve shaft.

17. The valve of claim 7, wherein the upper end of the valve shaft is engaged by the solenoid, the lower end of the valve shaft is received in a depression in an upper one of the valve plugs, and wherein the upper one of the valve plugs is provided with a downwardly extending protrusion which engages a lower one of the valve plugs.

18. The valve of claim 8, wherein the lower end of the valve shaft is secured to the upper valve plug by a pin which extends substantially normal to the axis, the pin extending through a bore in the lower end of the valve shaft and through at least one hole in the upper valve plug, the pin being closely received in the bore of the valve shaft and loosely received in the hole of the upper valve plug so as to permit a limited amount of relative movement between the valve shaft and the upper valve plug.

19. The valve of claim 18, wherein the lower end of the valve shaft is loosely received inside the depression of the upper valve plug so as to permit a limited amount of relative movement between the valve shaft and the upper valve plug in a direction perpendicular to the axis.

20. The valve of claim 17, wherein a lower end of the protrusion of the upper valve plug is received in a depression in the lower valve plug, the lower end of the protrusion being secured to the lower valve plug by a pin which extends substantially normal to the axis, the pin extending through a bore in the lower end of the protrusion and through at least one hole in the lower valve plug, the pin being closely received in the hole of the lower valve plug and loosely received in the bore of the protrusion so as to permit a limited amount of relative axial movement between the valve shaft and the lower valve plug.

21. The valve of claim 1, wherein the first biasing mechanism comprises a coil spring having a upper end and a lower end, the upper end engaging a lower one of the valve plugs and the lower end engaging a seating surface of the valve body, wherein the coil spring is compressed when the lower plug moves toward its closed position.

22. The valve of claim 21, further comprising a second biasing mechanism for biasing the valve plugs away from one another along the axis, the second biasing mechanism comprising an axially-extending coil spring surrounding the shaft and received between the upper and lower valve plugs, wherein the coil spring of the first biasing mechanism is weaker than the coil spring of the second biasing mechanism.

23. The valve of claim 1, wherein the sealing surfaces of one or both of the valve plugs are provided with resilient sealing means.

24. The valve of claim 23, wherein the resilient sealing means are provided on the sealing surfaces of one or both of the valve plugs.

25. The valve of claim 1, wherein the exterior portion of the fitting block comprises an inlet fitting which defines the valve inlet and is attached to the attachment portion of the fitting block.

26. The valve of claim 25, wherein the upper valve plug and the upper valve seat are of greater diameter than the lower valve plug.

27. The valve of claim 26, wherein both the upper valve seat and the lower valve seat form part of a bushing which is received inside the wall inlet chamber.

28. The valve of claim 1, wherein the lower valve seat is integrally formed with the fitting block.

29. The valve of claim 1, wherein one or both of the upper valve plug and the lower valve plug is provided with a side surface having an axially-extending portion with a diameter less than that of the respective upper or lower valve seat so as to guide the valve plug into engagement with the valve seat.

30. The valve of claim 1, wherein the fitting block is removably fastened to the housing.

31. The valve of claim 1, wherein the interior portion of the fitting block comprises a valve seat fitting comprising said pair of valve seats and further comprising a peripheral side wall extending between the valve seats; wherein the peripheral side wall defines an inlet chamber located in the interior chamber of the valve body and which is in communication with the valve inlet; and wherein the inlet chamber has a pair of aligned openings, each of which is surrounded by one of the valve seats, such that with the valve plugs in their closed positions the inlet chamber is substantially sealed from the outlet.

32. The valve of claim 31, wherein the peripheral side wall of the valve seat fitting extends from the valve inlet to the valve seats so as to separate the inlet and the inlet chamber from the remainder of the interior chamber of the valve body.

33. The valve of claim 31, wherein the peripheral side wall of the valve seat fitting is connected to the attachment portion of the fitting block.

34. The valve of claim 1, wherein the exterior portion, the attachment portion and the interior portion of the fitting block are separately formed.

35. The valve of claim 34, wherein the exterior portion, the attachment portion and the interior portion of the fitting block are attached together by brazing.

36. The valve of claim 1, wherein the exterior portion, the attachment portion and the interior portion of the fitting block are integrally formed.

37. The valve of claim 1, wherein the sealing surfaces of one or both of the valve seats are provided with resilient sealing means.

38. The valve of claim 1, wherein the housing has an opening through which the interior portion of the fitting block extends and the opening has a diameter which is greater than a height and a width of the interior portion of the fitting block; wherein the height of the interior portion of the fitting block is measured parallel to the axis and the width of the interior portion is measured perpendicular to the axis and perpendicular to the direction in which the inlet and outlet are spaced from one another.

39. The valve of claim 1, wherein the attachment flange has a cylindrical portion which extends through an opening in the housing and wherein the interior portion of the fitting block is attached to the cylindrical portion.

* * * * *

UNITED STATES PATENT AND TRADEMARK OFFICE
CERTIFICATE OF CORRECTION

PATENT NO.      : 7,178,553 B2
APPLICATION NO. : 10/839897
DATED           : February 20, 2007
INVENTOR(S)     : Peric et al.

It is certified that error appears in the above-identified patent and that said Letters Patent is hereby corrected as shown below:

Column 17, line 52, please delete "anf" and insert --and--.

Column 18, line 4, please delete "to the axis".

Column 18, line 22, after "by a small amount normal" please insert --to the axis.--.

Column 18, line 32, please delete "claim 8" and insert --claim 17--.

Signed and Sealed this

Twenty-eighth Day of August, 2007

JON W. DUDAS
*Director of the United States Patent and Trademark Office*